US012772147B2

(12) United States Patent
Huang

(10) Patent No.: US 12,772,147 B2
(45) Date of Patent: Oct. 20, 2026

(54) ACCESS POINT, STATION, AND WIRELESS COMMUNICATION METHOD

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 270 days.

(21) Appl. No.: 18/634,342

(22) Filed: Apr. 12, 2024

(65) Prior Publication Data

US 2024/0259916 A1 Aug. 1, 2024

Related U.S. Application Data

(63) Continuation of application No. PCT/CN2022/112841, filed on Aug. 16, 2022.

(30) Foreign Application Priority Data

Oct. 15, 2021 (SG) ............................ 10202111490P

(51) Int. Cl.
*H04W 48/08* (2009.01)

(52) U.S. Cl.
CPC .................................. *H04W 48/08* (2013.01)

(58) Field of Classification Search
CPC ...... H04W 48/08; H04W 84/12; H04B 7/024; H04L 5/0007; H04L 5/0023; H04L 5/0037; H04L 5/0044; H04L 5/0053
USPC .......................................................... 455/507
See application file for complete search history.

(56) References Cited

U.S. PATENT DOCUMENTS 11,792,842 B2 * 10/2023 Chen ..................... H04W 72/54 370/329
2021/0144752 A1 5/2021 Chen et al.
2021/0212035 A1 * 7/2021 Son ....................... H04L 5/0044
(Continued)

FOREIGN PATENT DOCUMENTS

CN 110768757 2/2020
CN 111669204 9/2020
(Continued)

OTHER PUBLICATIONS

Deng et al., "IEEE 802.11be—Wi-Fi 7: New Challenges and Opportunities," IEEE Communications Surveys & Tutorials, Jul. 29, 2020, vol. 22, No. 4.
(Continued)

*Primary Examiner* — Eugene Yun
(74) *Attorney, Agent, or Firm* — Hodgson Russ LLP

(57) ABSTRACT

An access point (AP), a station (STA), and a wireless communication method are provided. The wireless communication method by the AP includes transmitting, to one or more stations (STAs), an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP or a VBSS color of an AP candidate set of which the AP is a member.

14 Claims, 11 Drawing Sheets

(56) References Cited

U.S. PATENT DOCUMENTS

| | | | | |
|---|---|---|---|---|
| 2023/0114857 | A1* | 4/2023 | Lou | H04L 5/0044 370/329 |
| 2024/0008083 | A1* | 1/2024 | Ko | H04W 74/0816 |

FOREIGN PATENT DOCUMENTS

| | | |
|---|---|---|
| CN | 113365353 | 9/2021 |
| WO | 2021141530 | 7/2021 |

OTHER PUBLICATIONS

WIPO, International Search Report and Written Opinion for International Application No. PCT/CN2022/112841, Nov. 15, 2022.
IEEE P802.11be/D1.2, Unapproved IEEE Standards Draft, Sep. 2021.
Au, "Compendium of straw polls and potential changes to the Specification Framework Document Part 2," 20/1935r44, IEEE P802.11, Sep. 2021.
Huang et al., "Operation of Virtual BSS for Multi-AP Coordination," doc.: IEEE 802.11-19/1972r1, Nov. 2019.
Yang et al., "Making BSS transitions obsolete with multi-AP operations (Virtual BSS)," doc.: IEEE 802.11-20/1247r2, Nov. 2020.
Naribole et al., "Virtual BSS for Multi-AP Coordination Follow-up," doc.: IEEE 802.11-19/1451r1, Sep. 2019.
Lee et al., "Virtual BSS For Multi AP Coordination," doc.: IEEE 802.11-19/1019r0, Jul. 2019.

* cited by examiner

ACCESS POINT, STATION, AND WIRELESS COMMUNICATION METHOD

CROSS-REFERENCE TO RELATED APPLICATION(S)

This application is a continuation of International Application No. PCT/CN2022/112841, filed Aug. 16, 2022, which claims priority to Singapore Patent Application No. 10202111490P, filed Oct. 15, 2021, the entire disclosures of which are hereby incorporated by reference.

TECHNICAL FIELD

The present disclosure relates to the field of communication systems, and more particularly, to an access point (AP), a station (STA), and a wireless communication method.

BACKGROUND

Communication systems such as wireless communication systems are widely deployed to provide various types of communication content such as voice, video, packet data, messaging, broadcast, and so on. These communication systems may be multiple-access systems capable of supporting communication with multiple users by sharing available system resources (such as, time, frequency, and power). A wireless network, for example a wireless local area network (WLAN), such as a Wi-Fi (institute of electrical and electronics engineers (IEEE) 802.11) network may include an access point (AP) that may communicate with one or more stations (STAs) or mobile devices. The WLAN enables a user to wirelessly access an internet based on radio frequency technology in a home, an office, or a specific service area using a portable terminal such as a personal digital assistant (PDA), a laptop computer, a portable multimedia player (PMP), a smartphone, etc. The AP may be coupled to a network, such as the internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink may refer to a communication link from the AP to the STA, and the uplink may refer to a communication link from the STA to the AP.

IEEE 802.11 TGbe is developing anew IEEE 802.11 amendment which defines extremely high throughput (EHT) physical layer (PHY) and medium access control (MAC) layers capable of supporting a maximum throughput of at least 30 Gbps. To this end, it has been proposed to increase maximum channel bandwidth to 320 MHz and increase maximum number of spatial streams to 16. In addition, it has been proposed to enable multi-AP coordination in a multi-AP system in order to improve system throughput. Example multi-AP coordination schemes include multi-AP coordinated downlink (DL) orthogonal frequency division multiple access (OFDMA) and multi-AP coordinated DL multi-user multiple input multiple output (MU-MIMO), etc. The multi-AP coordinated DL MU-MIMO may also be called multi-AP DL distributed MIMO or multi-AP DL joint transmission. However, it is still an open issue to efficiently implement multi-AP DL coordination in a multi-AP system.

Therefore, there is a need for an access point (AP), a station (STA), and a wireless communication method, which can solve issues in the prior art, efficiently implement multi-AP downlink (DL) coordination in a multi-AP system, achieve extremely high throughput, provide good communication performance, and/or provide high reliability.

SUMMARY

In a first aspect of the present disclosure, a wireless communication method by a station (STA) comprises receiving, from an access point (AP), an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP or a VBSS color of an AP candidate set of which the AP is a member.

In a second aspect of the present disclosure, an AP comprises a memory configured to store instructions, a transceiver, and a processor coupled to the memory and the transceiver. The instructions, when executed, cause the AP to transmit, to one or more STAs, an EHT MU PPDU, wherein the EHT MU PPDU comprises a BSS/VBSS color subfield in a U-SIG field, and the BSS/VBSS color subfield in the U-SIG field indicates a BSS color of the AP or a VBSS color of an AP candidate set of which the AP is a member.

In a third aspect of the present disclosure, an STA comprises a memory configured to store instructions, a transceiver, and a processor coupled to the memory and the transceiver. The instructions, when executed, cause the STA to perform the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1A:
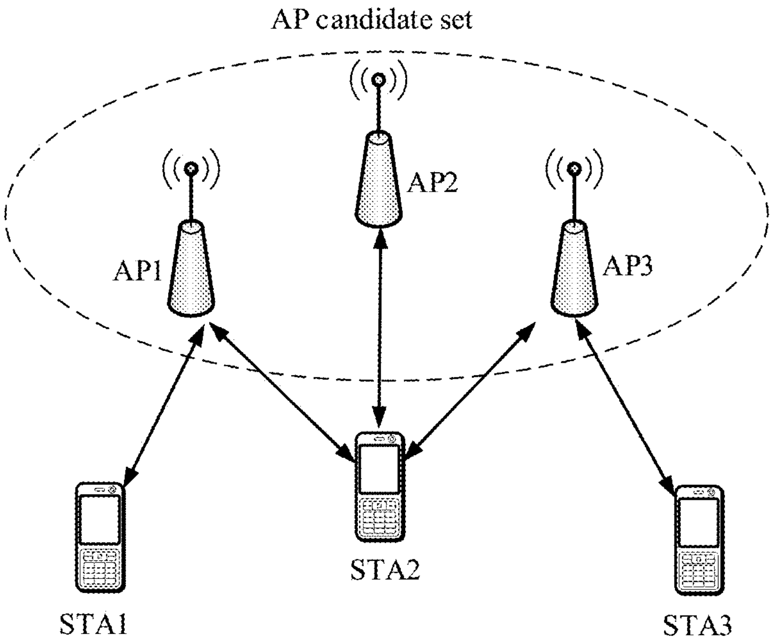
FIG. 1A is a schematic diagram illustrating an example AP candidate set which comprises APs according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

TABLE 1

| Abbreviation | Full name |
|---|---|
| IEEE | Institute of Electrical and Electronics Engineers |
| WLAN | Wireless local area network |
| BSS | Basic service set |
| VBSS | Virtual BSS |
| AP | Access point |
| STA | Station |
| PHY | Physical layer |
| MAC | Medium access control |
| MPDU | MAC protocol data unit |
| PPDU | Physical layer protocol data unit |
| PSDU | Physical layer service data unit |
| A-PPDU | aggregated PPDU |
| HT | High throughput |
| HE | High efficiency |
| EHT | Extremely high throughput |
| MU | Multi-user |
| OFDMA | Orthogonal frequency division multiple access |
| L-LTF | Non-HT Long Training field |
| L-STF | Non-HT Short Training field |
| L-SIG | Non-HT SIGNAL field |
| RL-SIG | Repeated L-SIG |
| U-SIG | Universal SIGNAL field |
| EHT-SIG | EHT SIGNAL field |
| EHT-STF | EHT Short Training field |
| EHT-LTF | EHT Long Training field |
| PE | Packet Extension field |
| BW | Bandwidth |
| GI | Guard interval |
| RU | Resource unit |
| MRU | Multiple resource unit |
| MCS | Modulation and coding scheme |
| FEC | Forward error coding |
| TXOP | Transmission opportunity |
| MIMO | Multiple input multiple output |
| MIB | Management information base |
| MAPC | Multi-AP coordination |
| MLD | Multi-link device |
| SME | Station management entity |
| AID | Association identifier |
| BSSID | BSS identifier |

TABLE 1-continued

| Abbreviation | Full name |
|---|---|
| SSID | Service set identifier |
| VAID | Virtual AID |
| VBSSID | Virtual BSSID |

AP refers to a standalone AP or an AP affiliated with an AP MLD; and STA refers to a standalone non-AP STA or an STA affiliated with a non-AP MLD. dot11EHTBaseLineFeaturesImplementedOnly and dot11Multi-APCoordinationOptionImplemented are two of MIB variables maintained by an STA's (or an AP's) SME. STA (or AP) with dot11EHTBaseLineFeaturesImplementedOnly equal to true refers to an EHT STA (or an EHT AP) that supports one or more EHT baseline features such as MRU and multi-link operation which have been defined in IEEE 802.11be D1.2; but does not support any EHT advanced features such as multi-AP coordination which will be defined in a later draft of IEEE 802.11be (e.g. IEEE 802.11be D3.0), i.e. WiFi7 R1 STA (or AP). STA (or AP) with dot11EHTBaseLineFeaturesImplementedOnly equal to false refers to an EHT STA (or an EHT AP) that support one or more EHT baseline features which have been defined in IEEE 802.11be D1.2 and one or more EHT advanced features which will be defined in a later draft of IEEE 802.11be (e.g., IEEE 802.11be D3.0), i.e., WiFi7 R2 STA (or AP). STA (or AP) with dot11Multi-APCoordinationOption-Implemented equal to true refers to an EHT STA (or an EHT AP) that supports multi-AP coordination; and STA (or AP) with dot11Multi-APCoordinationOptionImplemented equal to false refers to an EHT STA (or an EHT AP) that does not support multi-AP coordination. STA (or AP) with dot11EHTBaseLineFeaturesImplementedOnly equal to false and dot11Multi-APCoordinationOptionImplemented equal to true is called a multi-AP coordination (MAPC) capable STA (or AP); and STA (or AP) with dot11EHTBaseLineFeaturesImplementedOnly equal to true or with both dot11EHTBaseLineFeaturesImplementedOnly and dot11Multi-APCoordinationOptionImplemented equal to false is called a MAPC incapable STA (or AP) thereafter.

An AP candidate set is a set of MAPC capable APs that can initiate or participate in a multi-AP coordination. A coordinator which is responsible for establishing and maintaining an AP candidate set may be a member AP of the AP candidate set or outside of the AP candidate set. An AP which obtains a TXOP and initiates a multi-AP coordination is the sharing AP. An AP in an AP candidate set can participate as a shared AP in a multi-AP coordination initiated by a sharing AP in the same AP candidate set. At least one AP in an AP candidate set shall be capable of being a sharing AP. A multi-AP coordination may include a multi-AP coordination preparation phase and a multi-AP coordinated transmission phase. In the multi-AP coordination preparation phase, a sharing AP obtaining a TXOP and initiating the multi-AP coordination may transmit a first frame to one or more AP in the same AP candidate set to inquire about respective intentions to participate in the multi-AP coordination. Each of the one or more AP will respond with a second frame to inform the sharing AP of whether it intends to participate in the multi-AP coordination. For example, the first frame may include information indicating an intended multi-AP coordination scheme, and any AP that receives the first frame may get that the sharing AP is inquiring about its intention to participate in the multi-AP coordination, based on the intended multi-AP coordination scheme. If an AP intends to participate in the multi-AP coordination, it becomes a shared AP in the multi-AP coordination. In the multi-AP coordinated transmission phase, the sharing AP and one or more shared AP may participate in a multi-AP coordinated transmission. Alternatively, the sharing AP may not participate in a multi-AP coordinated transmission; and two or more shared APs may participate in a multi-AP coordinated transmission.

Figure 1B:
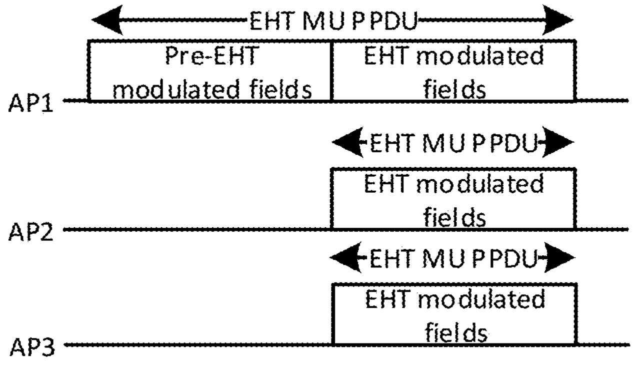
FIG. 1B is a schematic diagram illustrating an example multi-AP DL joint transmission according to an embodiment of the present disclosure.

FIG. 1A illustrates an example AP candidate set which comprises three APs: AP1, AP2 and AP3. In an instant, AP1 may obtain a TXOP and initiate a multi-AP coordination as the sharing AP while AP2 and AP3 may participate as the shared APs in the multi-AP coordination. AP1, AP2 and AP3 may participate in a multi-AP coordinated transmission (e.g., multi-AP coordinated DL OFDMA transmission or multi-AP DL joint transmission as illustrated in FIG. 1B) in the TXOP. In another instant, AP2 may obtain a TXOP and initiate a multi-AP coordination as the sharing AP; and AP1 and AP3 may participate as the shared APs in the multi-AP coordination. AP1 and AP3 may participate in a multi-AP coordinated transmission in the TXOP but AP2 does not participate in the multi-AP coordinated transmission.

According to some embodiments of the present disclosure, an AP candidate set forms a virtual BSS (VBSS), which may be identified by a MAC address (i.e., VBSSID). An AP candidate set or a VBSS can also be identified by a VBSS color. In one embodiment, VBSS colors are in a same value space with BSS colors. In this case, the value range of a VBSS color does not overlap with the value range of a BSS color. For example, the value of a BSS color ranges from 0 to N; and the value of a VBSS color ranges from N+1 to 63; where N is a positive integer ranging from 1 to 62 and the value of N is pre-defined or configurable. The value of N may be indicated in the Beacon, Probe Response frame, Association Response frame and/or Reassociation Response frame. In another embodiment, VBSS colors are in a different value space with BSS colors. In this case, the value range of a VBSS color may overlap with the value range of a BSS color. An AP may belong to more than one AP candidate set. An AP candidate set may include up to eight APs, and each AP in an AP candidate set is identified by an AP ID. An AP may indicate configuration information and operational parameters of each AP candidate set of which it is a member in transmitted Beacon and/or Probe Response frames. The configuration information and operational parameters of an AP candidate set may comprise SSID, Short SSID, VBSSID, VBSS color, BSSID of each member AP excluding the transmitting AP, BSS color of each member AP excluding the transmitting AP; and/or supported multi-AP coordinated transmission schemes. At any given instant, a MAPC capable STA is associated with no more than one AP candidate set. A MAPC capable STA may establish an association with an AP candidate set via a member AP of the AP candidate set wherein the member AP is called anchor AP of the STA. In one embodiment, the STA shall be associated with its anchor AP before it is associated with the AP candidate set via its anchor AP. In another embodiment, the STA may establish an association with its anchor AP and the AP candidate set simultaneously.

In some embodiments, during a MAPC capable STA establishes an association with an AP candidate set via its anchor AP, the AP candidate set's coordinator assigns a virtual AID (VAID) to the STA, which uniquely identifies the STA in the AP candidate set's VBSS. In one embodiment, VAIDs may be in a different value space from AIDs. In this case, the value range of a VAID may overlap with the value range of an AID. In another embodiment, VAIDs may be in a same value space as AIDs. In this case, the value range of a VAID does not overlap with the value range of an AID. For example, the value of an AID ranges from 1 to M; and the value of a VAID ranges from M+1 to 2007, where M is a positive integer ranging from 2 to 2006 and the value of M is pre-defined or configurable. The value of M may be indicated in the Beacon, Probe Response frame, Association Response frame and/or Reassociation Response frame.

After a MAPC capable STA is associated with an AP candidate set via its anchor AP, in the AP candidate set's VBSS, the STA may transmit a single PSDU to or receive one or more PSDU from one or more AP in the AP candidate set in a multi-AP coordinated transmission which involves more than one APs. In a multi-AP coordinated transmission, when a STA transmits a single PSDU to or receive more than one PSDUs from more than one APs, the more than one APs comprises the STA's anchor AP. In a multi-AP coordinated transmission, when a STA transmits a single PSDU to or receive a single PSDU from a single AP, the AP is the STA's anchor AP. Alternatively, the AP is any AP involved in the multi-AP coordinated transmission. In addition, the STA may transmit a single PSDU to or receive a single PSDU from a single AP in a non-coordinated transmission. The single AP is STA's anchor AP. Alternatively, the single STA is any AP in the AP candidate set. Taking the multi-AP system as illustrated in FIG. 1A as an example where STA2's anchor AP is assumed to AP2. In a multi-AP coordinated transmission, STA2 may transmit a single PSDU to or receive a single PSDU from AP2 only; or transmit a single PSDU to or receive two or more PSDUs from AP2 and at least one of AP1 and AP3. In a non-coordinated transmission, STA2 may transmit a single PSDU to or receive a single PSDU from AP2 only.

A multi-AP coordinated DL transmission is a multi-AP coordinated DL OFDMA transmission or a multi-AP DL joint transmission. FIG. 1B illustrates that, in some embodiments, in a multi-AP DL joint transmission, two or more of sharing AP and shared AP(s) transmit respective EHT MU PPDUs to a single STA or different STAs at a single RU or MRU that occupies all non-punctured 20 MHz channels within a coordinated transmission bandwidth. In a multi-AP coordinated DL OFDMA transmission, two or more of sharing AP and shared AP(s) transmit respective EHT MU PPDUs to different STAs at different frequency portions of a coordinated transmission bandwidth where each frequency portion comprises one or more 80 MHz frequency subblock. In a multi-AP coordinated DL OFDMA transmission, more than one of sharing AP and shared AP(s) may transmit respective EHT MU PPDUs to a single STA or different STAs at a single RU or MRU that occupies all the non-punctured 20 MHz channels within a same frequency portion of a coordinated transmission bandwidth in a similar manner to a multi-AP DL joint transmission.

FIG. 1B illustrates that, in some embodiments, when multiple APs transmit respective EHT MU PPDUs which carry respective PSDUs for a same STA at a single RU or MRU that occupies all non-punctured 20 MHz channels within a coordinated transmission bandwidth or a frequency portion of the coordinated transmission bandwidth, the PSDUs for the STA are transmitted using a same FEC coding type and a same MCS. If the PSDUs for the STA have the same contents, they are transmitted using one or more same spatial streams. If the PSDUs for the STA have different contents, they are transmitted using different spatial streams.

In a multi-AP coordinated DL transmission, when multiple APs transmit respective EHT MU PPDUs at a single RU or MRU that occupies all non-punctured 20 MHz channels within a coordinated transmission bandwidth or a frequency portion of the coordinated transmission bandwidth, in one embodiment, not each of the EHT MU PPDUs transmitted by the multiple APs comprises pre-EHT modulated fields and EHT modulated fields transmitted by the multiple APs start at the same time. For example, only one of the EHT MU PPDUs transmitted by the multiple APs comprises the pre-EHT modulated fields, as illustrated in FIG. 1B. In particular, if the multiple APs comprises a sharing AP which initiates the multi-AP coordinated DL transmission, only the EHT MU PPDU transmitted by the sharing AP comprises the pre-EHT modulated fields. In this embodiment, a power scaling factor larger than one may be applied to the pre-EHT modulated fields. In other words, a transmission power of the pre-EHT modulated fields of the EHT MU PPDU may be larger than the EHT modulated fields of the EHT MU PPDU so that the pre-EHT modulated fields have same or similar overall transmission power to the EHT modulated fields for the EHT MU PPDUs transmitted by the multiple APs.

A multi-AP DL joint transmission is applicable to a coordinated transmission bandwidth of 20 MHz, 40 MHz, 80 MHz, 160 MHz or 320 MHz. A multi-AP coordinated DL OFDMA transmission is applicable to a coordinated transmission bandwidth of 160 MHz or 320 MHz but not applicable to a coordinated transmission bandwidth of 20 MHz, 40 MHz or 80 MHz. In a multi-AP coordinated DL transmission, EHT MU PPDUs transmitted by two or more of sharing AP and shared AP(s) shall have a same number of EHT-SIG symbols, a same GI and EHT-LTF type, a same number of EHT-LTF symbols and a same duration of Data field and PE field. As a result, all the EHT MU PPDUs have a same transmission time. When two or more of sharing AP and shared AP(s) transmit respective EHT MU PPDUs at a single RU or MRU that occupies all non-punctured 20 MHz channels within a coordinated transmission bandwidth or a same frequency portion of a coordinated transmission bandwidth, the U-SIG fields of the transmitted EHT MU PPDUs shall have the same content; and the EHT-SIG fields of the transmitted EHT MU PPDUs shall have the same content as well.

In a multi-AP coordinated DL OFDMA transmission, EHT MU PPDUs transmitted by two or more of sharing AP and shared AP(s) are aggregated in frequency domain and forms a MU A-PPDU. A MU A-PPDU consists of multiple EHT MU PPDU sets, each of which comprises one or more EHT MU PPDUs transmitted at a same frequency portion of the coordinated transmission bandwidth. The number of EHT MU PPDUs in an EHT MU PPDU set affiliated with a frequency portion of the coordinated transmission bandwidth equals to the number of APs to which the frequency portion is allocated. For example, if a frequency portion of the coordinated transmission bandwidth is allocated to a single AP (e.g. the sharing AP or a shared AP), the EHT MU PPDU set affiliated with the frequency portion comprises a single EHT MU PPDU. If a frequency portion of the coordinated transmission bandwidth is allocated to three APs (e.g. the sharing AP and two shared APs, or three shared APs), the EHT MU PPDU set affiliated with the frequency portion comprises three EHT MU PPDUs.

Figure 2A:
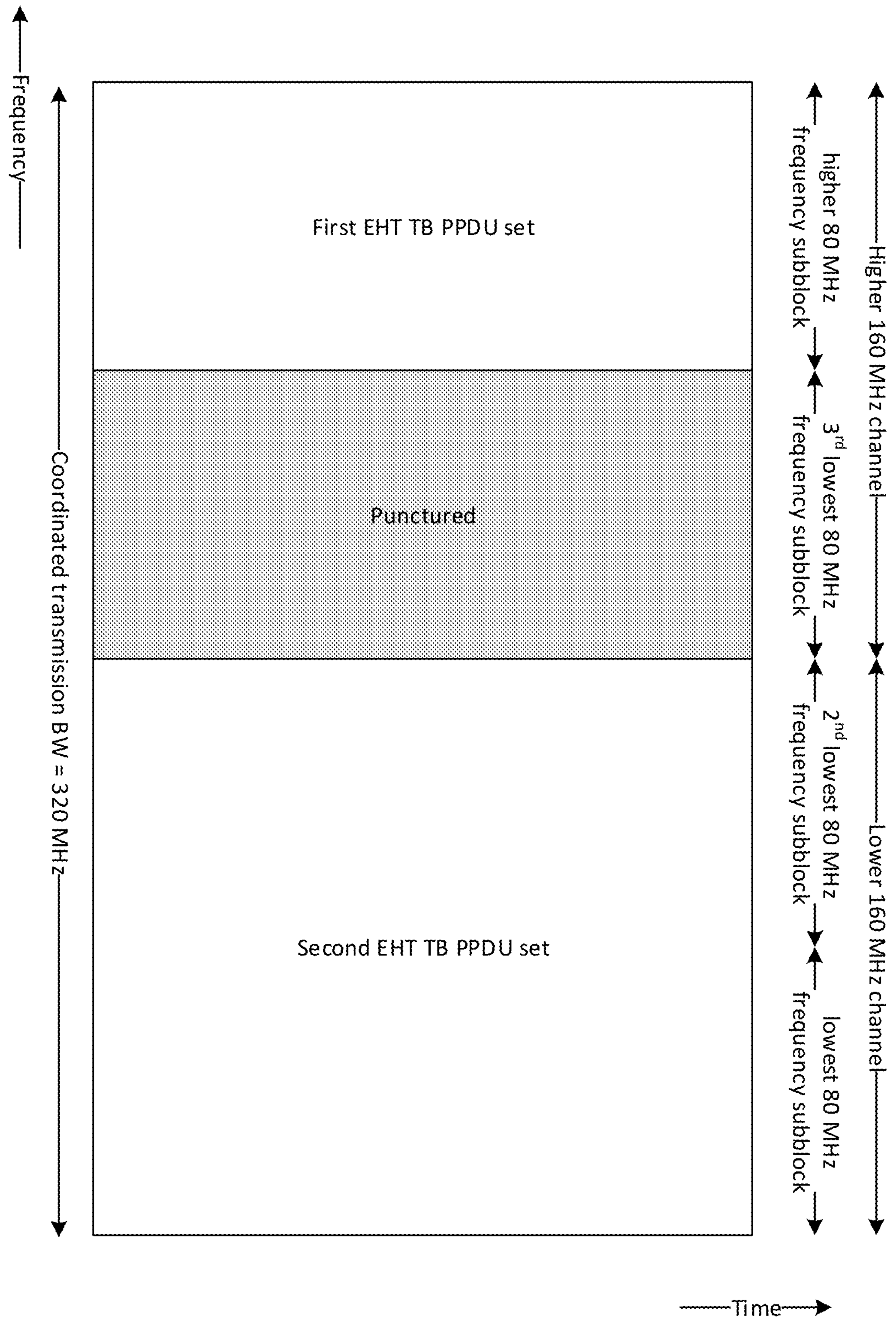
FIG. 2A is a schematic diagram illustrating a bandwidth allocation for multiple EHT MU PPDU sets according to an embodiment of the present disclosure.

For a multi-AP coordinated DL OFDMA transmission with a coordinated transmission bandwidth of 160 MHz, two 80 MHz frequency subblocks are allocated to two EHT MU PPDU sets, respectively. For a multi-AP coordinated DL OFDMA transmission with a coordinated transmission bandwidth of 320 MHz, there may have the following five options for bandwidth allocation for multiple EHT MU PPDU sets:

Option 1A: When one of 80 MHz frequency subblocks is punctured, the unpunctured 80 MHz frequency subblock which is within a same 160 MHz channel as the punctured 80 MHz frequency subblock is allocated to a first EHT MU PPDU set, and the other 160 MHz channel is allocated to a second EHT MU PPDU set, as illustrated in FIG. 2A.

Figure 2B:
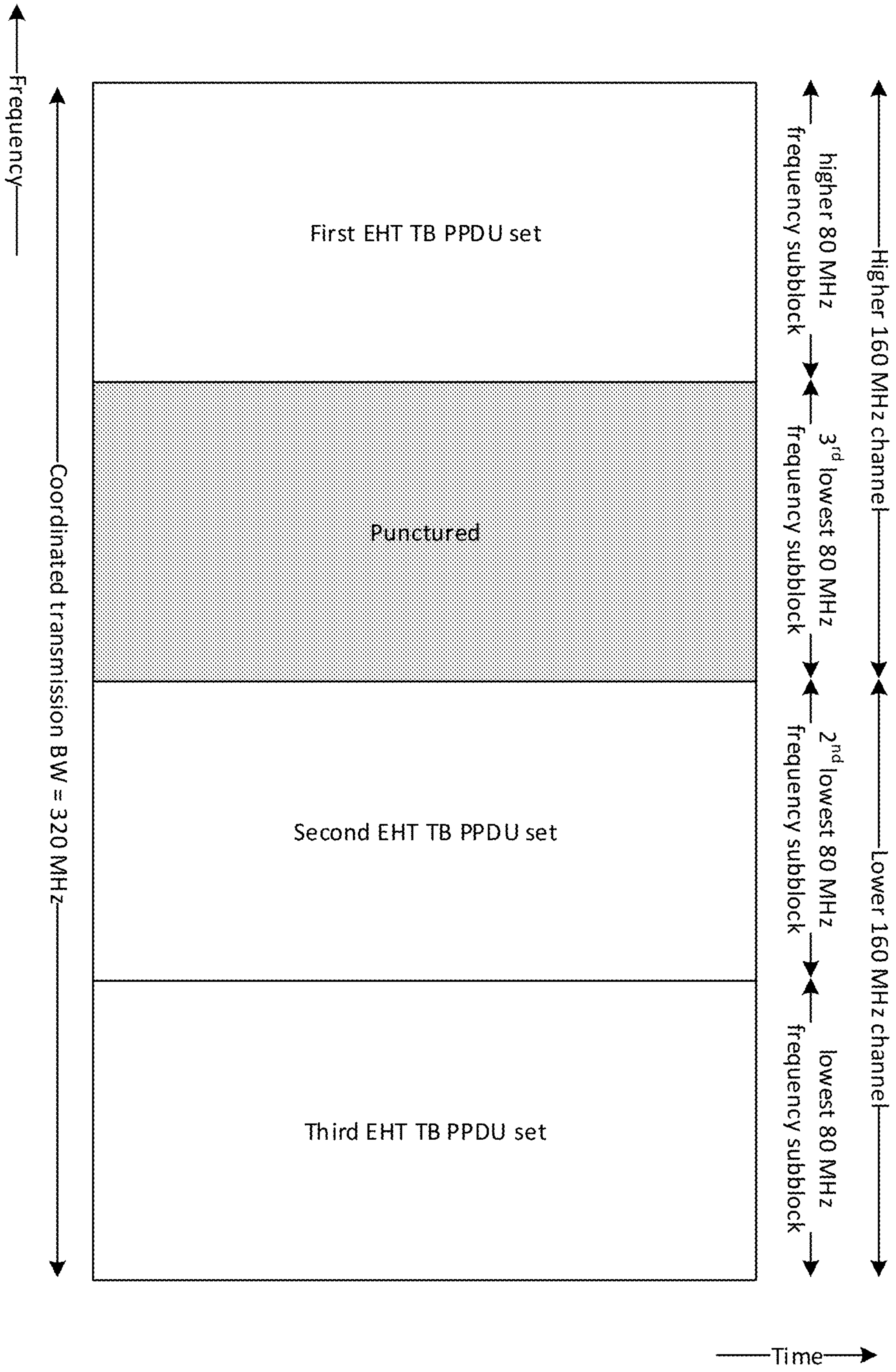
FIG. 2B is a schematic diagram illustrating a bandwidth allocation for multiple EHT MU PPDU sets according to an embodiment of the present disclosure.

Option 1B: When one of 80 MHz frequency subblocks is punctured, three unpunctured 80 MHz frequency subblocks are allocated to three EHT MU PPDU sets, respectively, as illustrated in FIG. 2B.

Figure 2C:
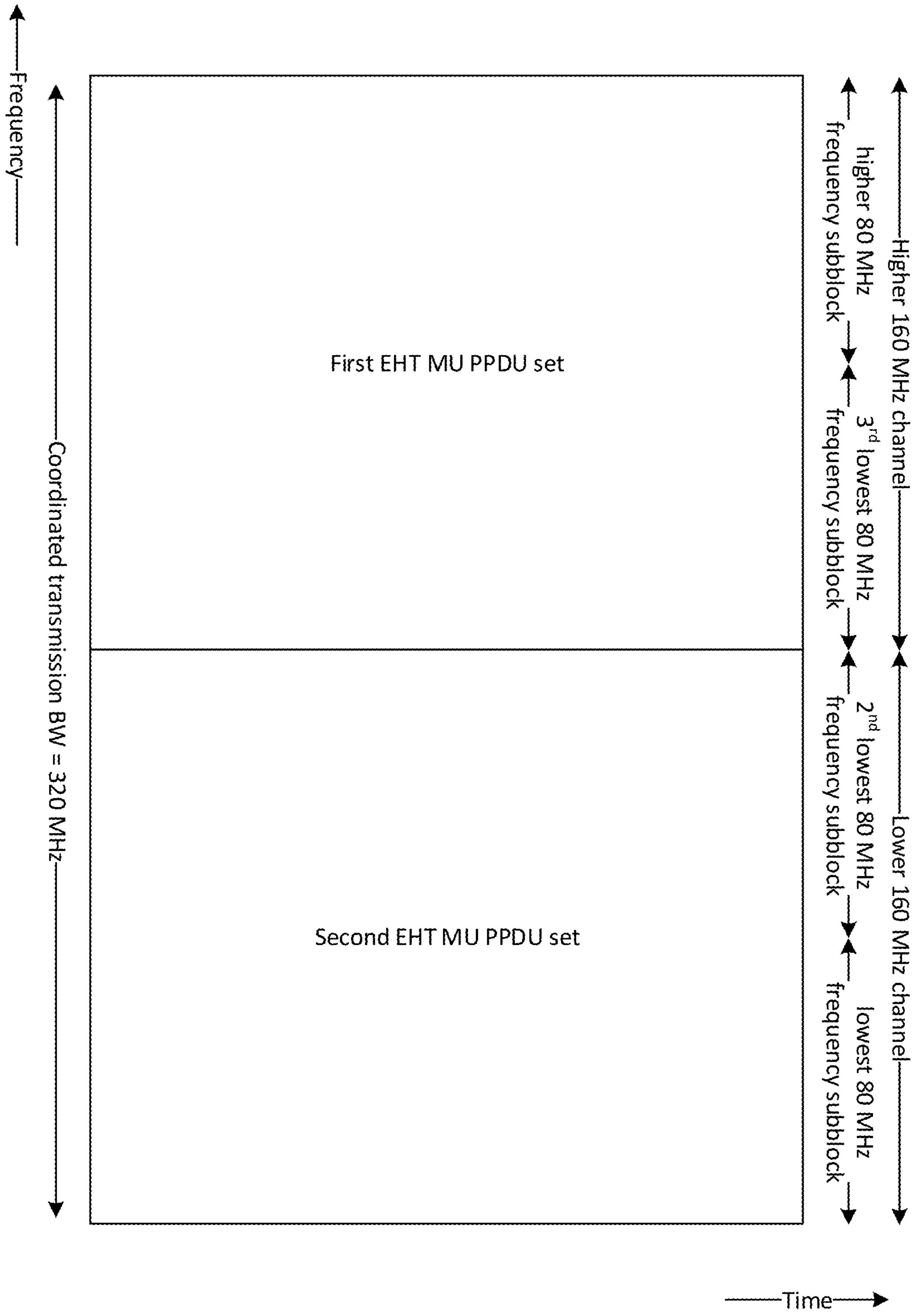
FIG. 2C is a schematic diagram illustrating a bandwidth allocation for multiple EHT MU PPDU sets according to an embodiment of the present disclosure.

Option 1C: Two 160 MHz channels are allocated to two EHT MU PPDU sets, respectively, as illustrated in FIG. 2C.

Figure 2D:
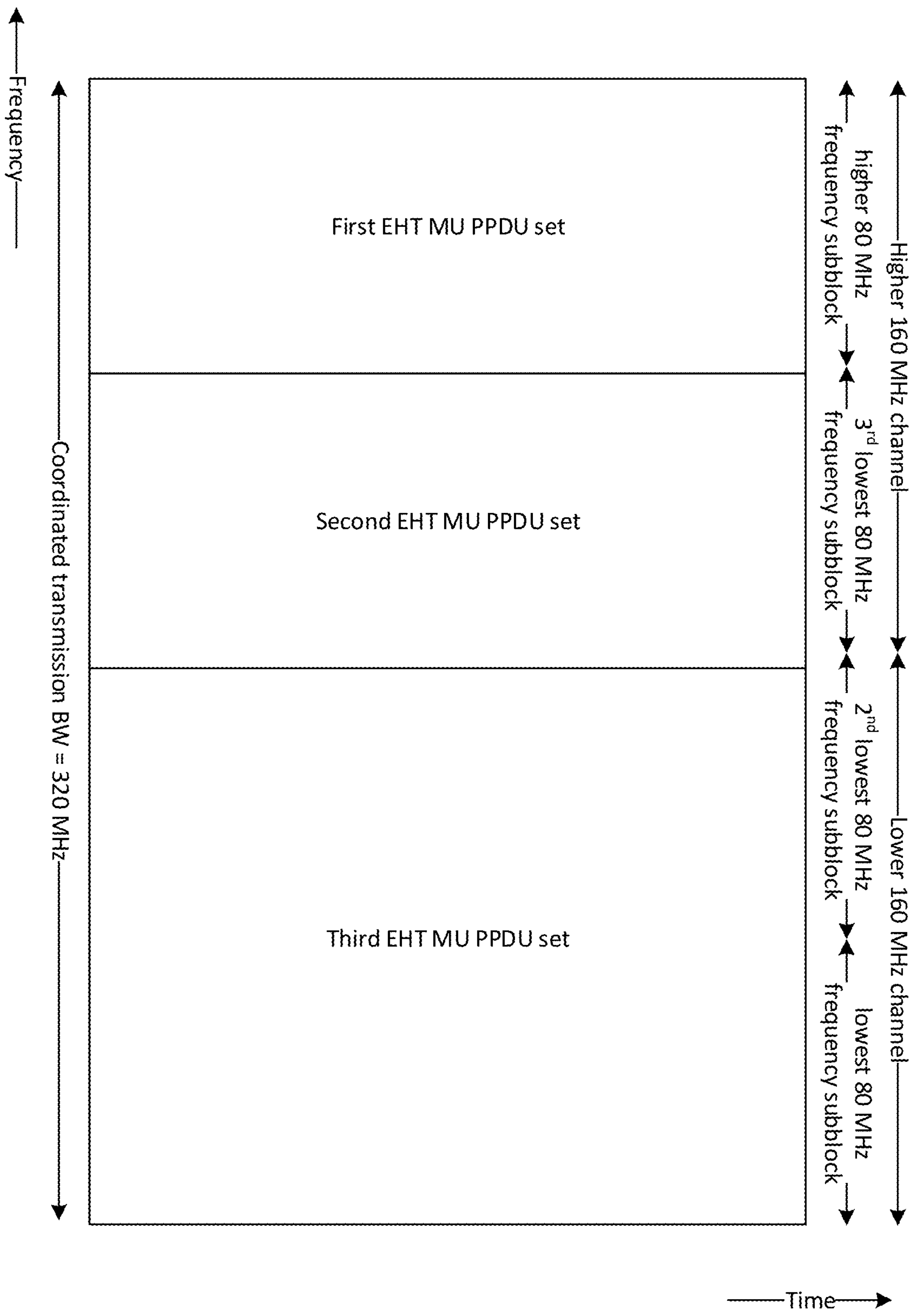
FIG. 2D is a schematic diagram illustrating a bandwidth allocation for multiple EHT MU PPDU sets according to an embodiment of the present disclosure.

Option 1D: Two 80 MHz frequency subblocks within a same 160 MHz channel are allocated to first two EHT MU PPDU sets, respectively; and the other 160 MHz channel is allocated to a third EHT MU PPDU set, as illustrated in FIG. 2D.

Figure 2E:
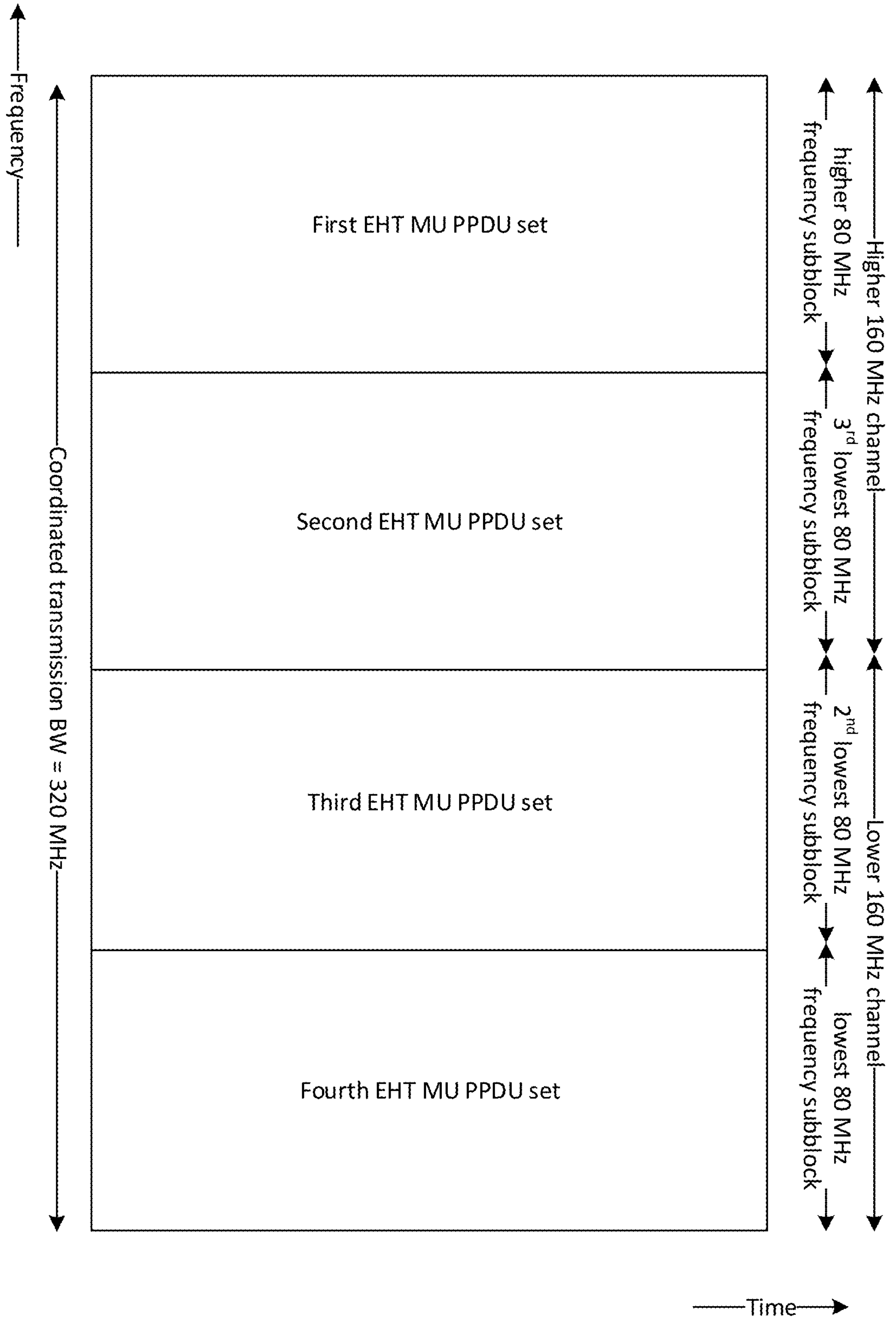
FIG. 2E is a schematic diagram illustrating a bandwidth allocation for multiple EHT MU PPDU sets according to an embodiment of the present disclosure.

Option 1E: Four 80 MHz frequency subblocks are allocated to four EHT MU PPDU sets, respectively, as illustrated in FIG. 2E.

Figure 3:
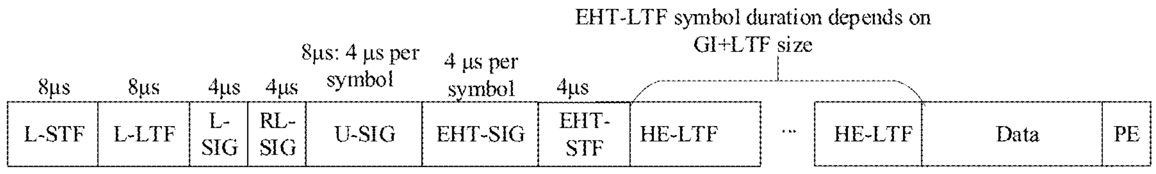
FIG. 3 is a schematic diagram illustrating an EHT MU PPDU format according to an embodiment of the present disclosure.

The EHT MU PPDU format as illustrated in FIG. 3 is used for a transmission that is not a response to a Trigger frame from an AP. The L-STF, L-LTF, L-SIG, RL-SIG, U-SIG and EHT-SIG are called pre-EHT modulated fields while the EHT-STF, EHT-LTF, Data field and PE are called EHT modulated fields. The U-SIG field comprises two OFDM symbols, each having a duration of 4 μs. Each EHT-LTF symbol has the same GI duration as each data symbol, which is 0.8 μs, 1.6 μs or 3.2 μs. The EHT-LTF comprises three types: 1×EHT-LTF, 2×EHT-LTF and 4× EHT-LTF. The duration of each 1×EHT-LTF, 2×EHT-LTF or 4×EHT-LTF symbol without GI is 3.2 μs, 6.4 μs or 12.8 μs. Each data symbol without GI is 12.8 μs. The PE duration of an EHT MU PPDU is 0 μs, 4 μs, 8 μs, 12 μs, 16 μs or 20 μs. For example, in details, the U-SIG has two OFDM symbols and each symbol is 4 μs. The number of EHT-SIG symbols may be variable. As a result, EHT-SIG duration may not be 8 μs.

U-SIG field carries information necessary to interpret EHT MU PPDUs. The U-SIG field is designed to bring forward compatibility to the EHT preamble via the introduction of version independent fields. These are the fields that will be consistent in location and interpretation across multiple IEEE 802.11 PHY versions. The intent of the version independent content is to achieve better coexistence among IEEE 802.11 PHY versions that are defined for 2.4, 5, and 6 GHz spectrum from EHT PHY onwards. In addition, the U-SIG can have some version dependent fields that are fields specific to an IEEE 802.11 PHY version. The U-SIG includes version independent bits followed by version dependent bits. In addition, the U-SIG field comprises one or more Validate fields. Validate field values serve to indicate whether to continue reception of an EHT MU PPDU at an STA. If an STA encounters an EHT MU PPDU where at least one field in the preamble that is identified as Validate for the STA is not set to the value specified for the field, the STA shall defer for the duration of the EHT MU PPDU, report the information from the version independent fields within the RXVECTOR, and terminate the reception of the EHT MU PPDU.

Figure 4:
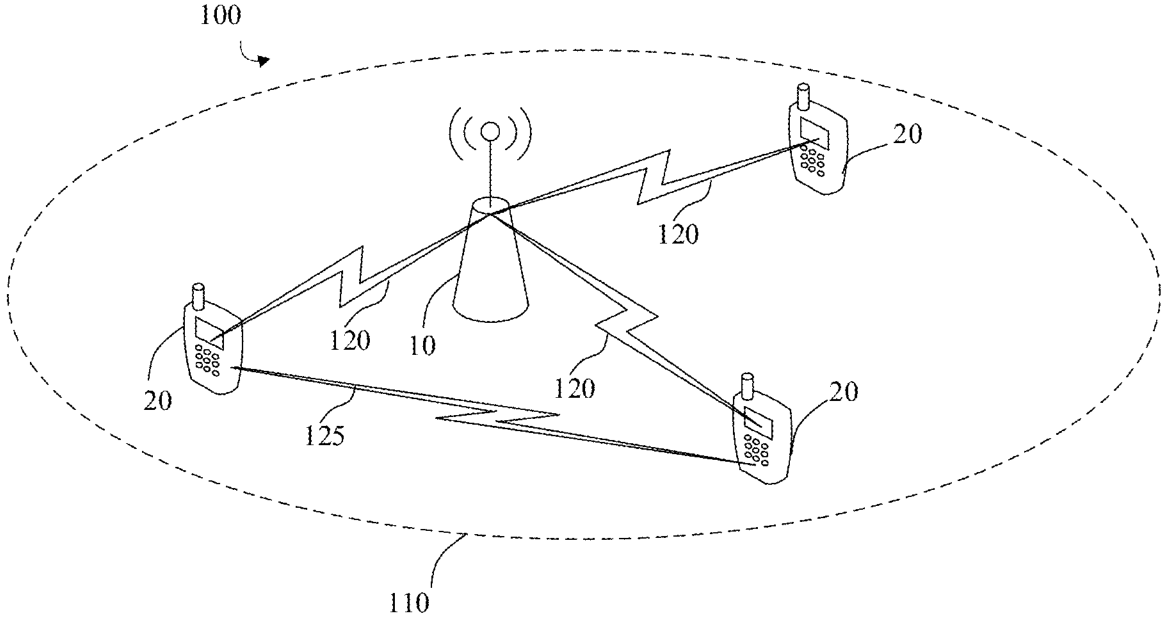
FIG. 4 is a schematic diagram illustrating an example of a wireless communications system according to an embodiment of the present disclosure.

FIG. 4 illustrates an example of a wireless communications system according to an embodiment of the present disclosure. The wireless communications system may be an example of a WLAN 100 (also known as a Wi-Fi network)

(such as next generation, next big thing (NBT), ultra-high throughput (UHT) or EHT Wi-Fi network) configured in accordance with various aspects of the present disclosure. As described herein, the terms next generation, NBT, UHT, and EHT may be considered synonymous and may each correspond to a Wi-Fi network supporting a high volume of space-time-streams. The WLAN 100 may include an AP 10 and multiple associated STAs 20, which may represent devices such as mobile stations, personal digital assistant (PDAs), other handheld devices, netbooks, notebook computers, tablet computers, laptops, display devices (such as TVs, computer monitors, etc.), printers, etc. The AP 10 and the associated stations 20 may represent a basic service set (BSS) or an extended service set (ESS). The various STAs 20 in the network can communicate with one another through the AP 10. Also illustrated is a coverage area 110 of the AP 10, which may represent a basic service area (BSA) of the WLAN 100. An extended network station (not shown) associated with the WLAN 100 may be connected to a wired or wireless distribution system that may allow multiple APs 10 to be connected in an ESS or a VBSS.

In some embodiments, a STA 20 may be located in the intersection of more than one coverage area 110 and may associate with more than one AP 10. A single AP 10 and an associated set of STAs 20 may be referred to as a BSS. An ESS or a VBSS is a set of connected BSSs. A distribution system (not shown) may be used to connect APs 10 in an ESS or a VBSS. In some cases, the coverage area 110 of an AP 10 may be divided into sectors (also not shown). The WLAN 100 may include APs 10 of different types (such as a metropolitan area, home network, etc.), with varying and overlapping coverage areas 110. Two STAs 20 also may communicate directly via a direct wireless link 125 regardless of whether both STAs 20 are in the same coverage area 110. Examples of direct wireless links 120 may include Wi-Fi direct connections, Wi-Fi tunneled direct link setup (TDLS) links, and other group connections. STAs 20 and APs 10 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, etc. In some other implementations, peer-to-peer connections or ad hoc networks may be implemented within the WLAN 100.

Figure 5:
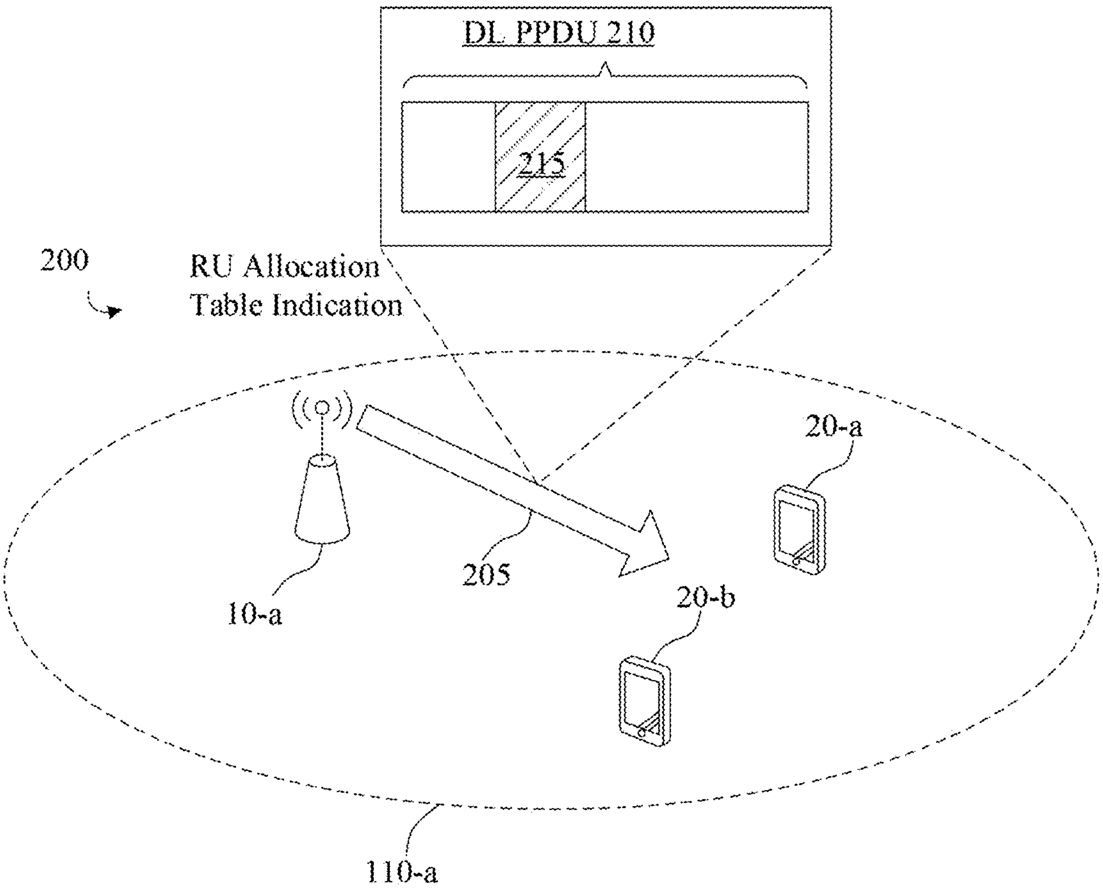
FIG. 5 is a schematic diagram illustrating an example of a wireless communications system according to another embodiment of the present disclosure.

FIG. 5 illustrates an example of a wireless communications system according to another embodiment of the present disclosure. The wireless communications system 200 may be an example of a next generation or EHT Wi-Fi system and may include an AP 10-*a* and STAs 20-*a* and 20-*b*, and a coverage area 110-*a*, which may be examples of components described with respect to FIG. 5. The AP 10-*a* may transmit a DL PPDU 210 (e.g., EHT MU PPDU) including an RU allocation table indication 215 on the downlink 205 to the STAs 20.

In some implementations, a wireless communications system 200 may be a next generation Wi-Fi system (such as, an EHT system). In some implementations, wireless communications system 200 may also support multiple communications systems. For instance, wireless communications system 200 may support EHT communications and HE communications. In some implementations, the STA 20-*a* and the STA 20-*b* may be different types of STAs. For example, the STA 20-*a* may be an example of an EHT STA, while the STA 20-*b* may be an example of an HE STA. The STA 20-*b* may be referred to as a legacy STA.

In some instances, EHT communications may support a larger bandwidth than legacy communications. For instance, EHT communications may occur over an available bandwidth of 320 MHz, whereas legacy communications may occur over an available bandwidth of 160 MHz. Additionally, EHT communications may support higher modulations than legacy communications. For instance, EHT communications may support 4K quadrature amplitude modulation (QAM), whereas legacy communications may support 1024 QAM. EHT communications may support a larger number of spatial streams than legacy systems. In one non-limiting illustrative example, EHT communications may support 16 spatial streams, whereas legacy communications may support 8 spatial streams. In some cases, EHT communications may occur a 2.4 GHz channel, a 5 GHz channel, or a 6 GHz channel in unlicensed spectrum.

Figure 6:
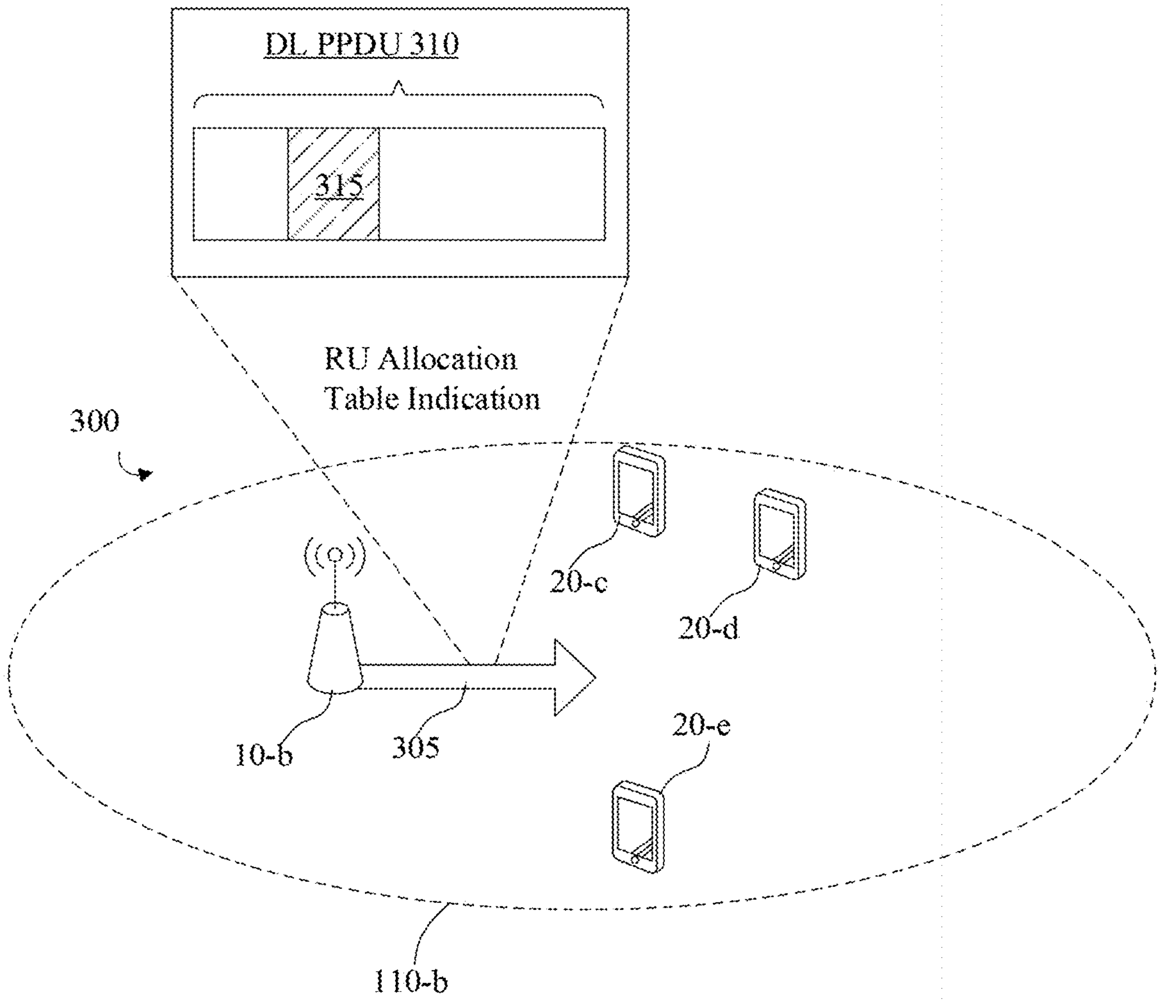
FIG. 6 is a schematic diagram illustrating an example of a wireless communications system according to another embodiment of the present disclosure.

FIG. 6 illustrates an example of a wireless communications system according to another embodiment of the present disclosure. The wireless communications system 300 may be an example of a post-EHT Wi-Fi system and may include an AP 10-*b*. AP 10-*b* may be an example of a post-EHT AP 10. The wireless communications system 300 may include HE STA 20-*c*, EHT STA 20-*d*, and post-EHT STA 20-*e*, and a coverage area 110-*b*, which may be examples of components described with respect to FIGS. 4 and 5. The AP 10-*b* may transmit a DL PPDU 310 including an RU allocation table indication 315 on the downlink 305 to the STAs 20. In some implementations, STAs 20 may be referred to as clients.

Figure 7:
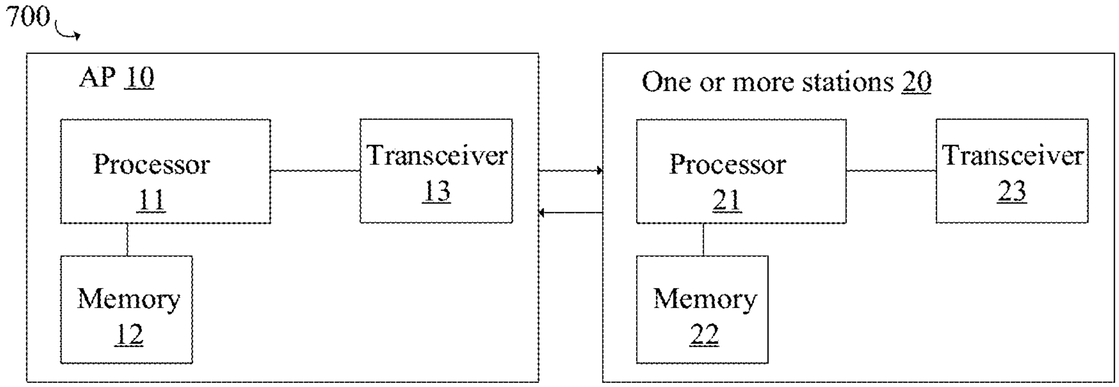
FIG. 7 is a block diagram of one or more stations (STAs) and an access point (AP) of communication in a wireless communications system according to an embodiment of the present disclosure.

FIG. 7 illustrates one or more STAs 20 and an AP 10 of communication in a wireless communications system 700 according to an embodiment of the present disclosure. FIG. 7 illustrates that, the wireless communications system 700 includes an AP 10 and one or more STAs 20. The AP 10 may include a memory 12, a transceiver 13, and a processor 11 coupled to the memory 12, the transceiver 13. The one or more STAs 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the transceiver 13 is configured to transmit, to one or more stations (STAs) 20, an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP 10 or a VBSS color of an AP candidate set of which the AP 10 is a member. This can solve issues in the prior art, efficiently implement multi-AP downlink (DL) coordination in a multi-AP system, achieve extremely high throughput, provide good communication performance, and/or provide high reliability.

In some embodiments, the transceiver 23 is configured to receive, from the AP 10, an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP 10 or a VBSS color of an AP candidate set of which the AP 10 is a member. This can solve issues in the prior art, efficiently implement multi-AP downlink (DL) coordination in a multi-AP system, achieve extremely high throughput, provide good communication performance, and/or provide high reliability.

In some embodiments, an access point (AP) 10 includes a transmitting unit (such as, the reference number 13 of FIG. 7) configured to transmit, to one or more stations (STAs), an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP or a VBSS color of an AP candidate set of which the AP is a member.

In some embodiments, a station (STA) 20 includes a receiving unit (such as, the reference number 23 of FIG. 7) configured to receive, from an access point (AP), an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP or a VBSS color of an AP candidate set of which the AP is a member.

Figure 8:
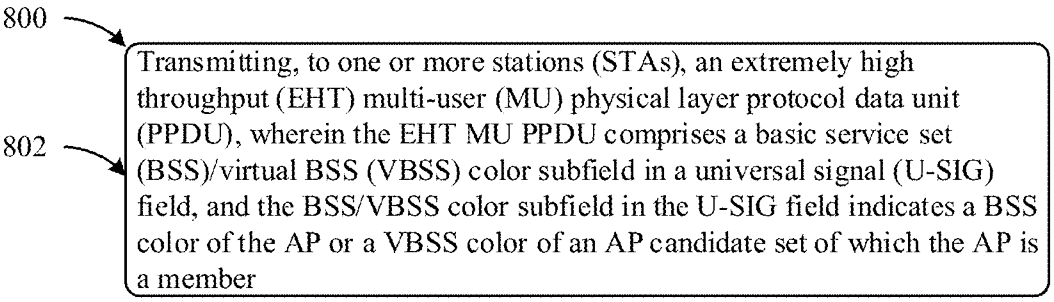
FIG. 8 is a flowchart illustrating a wireless communication method performed by an AP according to an embodiment of the present disclosure.

FIG. 8 illustrates a wireless communication method 800 performed by an AP according to an embodiment of the present disclosure. In some embodiments, the method 800 includes: a block 802, transmitting, to one or more stations (STAs), an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP or a VBSS color of an AP candidate set of which the AP is a member. This can solve issues in the prior art, efficiently implement multi-AP downlink (DL) coordination in a multi-AP system, achieve extremely high throughput, provide good communication performance, and/or provide high reliability.

Figure 9:
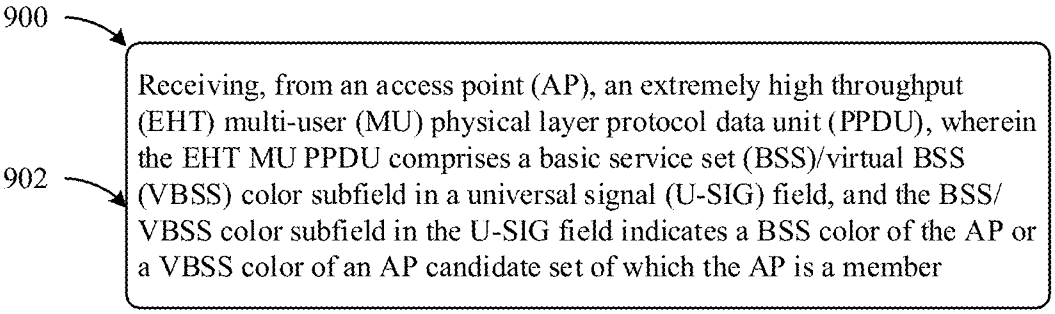
FIG. 9 is a flowchart illustrating a wireless communication method performed by a STA according to another embodiment of the present disclosure.

FIG. 9 illustrates a wireless communication method 900 performed by a STA according to an embodiment of the present disclosure. In some embodiments, the method 900 includes: a block 902, receiving, from an access point (AP), an extremely high throughput (EHT) multi-user (MU) physical layer protocol data unit (PPDU), wherein the EHT MU PPDU comprises a basic service set (BSS)/virtual BSS (VBSS) color subfield in a universal signal (U-SIG) field, and the BSS/VBSS color subfield in the U-SIG field indicates a BSS color of the AP or a VBSS color of an AP candidate set of which the AP is a member. This can solve issues in the prior art, efficiently implement multi-AP downlink (DL) coordination in a multi-AP system, achieve extremely high throughput, provide good communication performance, and/or provide high reliability.

In some embodiments, the AP candidate set is identified by the VBSS color of the AP candidate set. In some embodiments, VBSS colors of the BSS/VBSS color subfield in the U-SIG field share a same value space as BSS colors of the BSS/VBSS color subfield in the U-SIG field. In some embodiments, VBSS colors of the BSS/VBSS color subfield in the U-SIG field have a different value space from BSS colors of the BSS/VBSS color subfield in the U-SIG field. In some embodiments, a value range of a VBSS color of the BSS/VBSS color subfield in the U-SIG field is pre-defined or configurable. In some embodiments, if the AP is a multi-AP coordination (MAPC) capable AP and the EHT MU PPDU is transmitted in a BSS of the AP, the BSS/VBSS color subfield is set to indicate the BSS color of the AP. In some embodiments, if the AP is a MAPC capable AP and the EHT MU PPDU is transmitted in a VBSS of the AP candidate set, the BSS/VBSS color subfield is set to indicate the VBSS color of the AP candidate set. In some embodiments, if the EHT MU PPDU is used for a multi-AP coordinated transmission in the VBSS and if an STA receives a single PSDU from the EHT MU PPDU only, the AP is an anchor AP of the STA or any AP involved in the multi-AP coordinated transmission. In some embodiments, if the EHT MU PPDU is used for a non-coordinated transmission in the VBSS, the AP is an anchor AP for each of the one or more STAs or any AP in the AP candidate set.

In some embodiments, if the AP is a MAPC incapable AP, the BSS/VBSS color subfield is always set to indicate the BSS color of the AP. In some embodiments, the EHT MU PPDU comprises a BSS/VBSS subfield in the U-SIG field, and the BSS/VBSS subfield in the U-SIG field indicates whether the EHT MU PPDU is transmitted in a BSS of the AP or a VBSS of the AP candidate set. In some embodiments, if the AP is a MAPC capable AP and the EHT MU PPDU is transmitted in the BSS of the AP, the BSS/VBSS subfield is set to indicate a transmission in the BSS of the AP and the BSS/VBSS color subfield is set to indicate the BSS color of the AP. In some embodiments, if the AP is a MAPC capable AP and the EHT MU PPDU is transmitted in the VBSS of the AP candidate set, the BSS/VBSS subfield is set to indicate a transmission in the VBSS of the AP candidate set and the BSS/VBSS color subfield is set to indicate the VBSS color of the AP candidate set. In some embodiments, if the AP is a MAPC incapable AP, the BSS/VBSS subfield is always set to indicate a transmission in the BSS of the AP and the BSS/VBSS color subfield is set to indicate the BSS color of the AP. In some embodiments, the BSS/VBSS subfield is one of version independent fields of the U-SIG field. In some embodiments, the BSS/VBSS subfield corresponds to B25 of U-SIG-1 of the U-SIG field. In some embodiments, the BSS/VBSS subfield is one of version dependent fields of the U-SIG field. In some embodiments, the BSS/VBSS subfield corresponds to B2 or B8 of U-SIG-2 of the U-SIG field.

In some embodiments, the EHT MU PPDU comprises one or more user fields, each user field comprises a STA-ID/VSTA-ID subfield, and the STA-ID/VSTA-ID subfield indicates the STA addressed by the user field. In some embodiments, if the AP is a MAPC capable AP and the EHT MU PPDU is transmitted in a BSS, the STA-ID/VSTA-ID subfield is set to a value of a TXVECTOR parameter STA_ID. In some embodiments, if the AP is a MAPC capable AP and the EHT MU PPDU is transmitted in a VBSS, the STA-ID/VSTA-ID subfield is set to a value of a TXVECTOR parameter VSTA_ID. In some embodiments, if the AP is a MAPC incapable AP, the STA-ID/VSTA-ID subfield is always set to a value of a TXVECTOR parameter STA_ID. In some embodiments, each parameter VSTA_ID in a TXVECTOR identifies the STA or a group of STAs that is a recipient of a resource unit (RU) or multiple resource unit (MRU) in the EHT MU PPDU. In some embodiments, for an individually addressed RU or MRU, a parameter VSTA_ID is set to 11 least significant bits (LSBs) of a virtual association identifier (VAID) of the STA receiving a PSDU contained in the RU or the MRU. In some embodiments, the VAID of the STA uniquely identifies the STA in the BSS of the AP candidate set. In some embodiments, the VAID share a same value space as an AID. In some embodiments, the VAID have a different value space from an AID. In some embodiments, a value range of the VAID is pre-defined or configurable. In some embodiments, if the RU or MRU is intended for one or more STAs which are unassociated with the AP candidate set, a parameter STA_ID for the RU or MRU is set to 2045. In some embodiments, if the RU or MRU is intended for no user, a parameter VSTA_ID for the RU or MRU is set to 2046. In some embodiments, if the RU or MRU is intended for more than one associated STA in the VBSS that is not a recipient of an individually addressed RU or MRU, a parameter STA_ID for the RU or MRU is set to 0.

In some embodiments, when multiple APs comprising the AP transmit respective EHT MU PPDUs carrying respective PSDUs for a same STA at a single RU or MRU that occupies all non-punctured 20 MHz channels within a coordinated transmission bandwidth or a frequency portion of the coordinated transmission bandwidth, the PSDUs for the STA are transmitted using a same forward error coding (FEC) coding type and a same modulation and coding scheme (MCS). In some embodiments, if the PSDUs for the STA have same contents, the PSDUs for the STA are transmitted using one or more same spatial streams. In some embodiments, if the PSDUs for the STA have different contents, the PSDUs for the STA are transmitted using different spatial streams. In some embodiments, in a multi-AP coordinated DL transmission, when multiple APs comprising the AP transmit respective EHT MU PPDUs at a single RU or MRU that occupies all non-punctured 20 MHz channels within a coordinated transmission bandwidth or a frequency portion of the coordinated transmission bandwidth, not each of the EHT MU PPDUs comprises pre-EHT modulated fields and EHT modulated fields of all the EHT MU PPDUs start at the same time.

In some embodiments, only one of the EHT MU PPDUs transmitted by the multiple APs comprises the pre-EHT modulated fields. In some embodiments, if the multiple APs comprises a sharing AP which initiates the multi-AP coordinated DL transmission, only the EHT MU PPDU transmitted by the sharing AP comprises the pre-EHT modulated fields. In some embodiments, a power scaling factor larger than one is applied to the pre-EHT modulated fields. In some embodiments, a transmission power of the pre-EHT modulated fields of the EHT MU PPDU is larger than the EHT modulated fields of the EHT MU PPDU, such that the pre-EHT modulated fields have same or similar overall transmission power to the EHT modulated fields for the EHT MU PPDUs transmitted by the multiple APs. In some embodiments, in a multi-AP coordinated DL transmission, when the EHT MU PPDU, together with any of other EHT MU PPDUs, is transmitted at a same RU or MRU that occupies all non-punctured 20 MHz channels within a coordinated transmission bandwidth or a frequency portion of a coordinated transmission bandwidth, the BSS/VBSS subfield is set to indicate that the EHT MU PPDU is transmitted in a VBSS. In some embodiments, when the EHT MU PPDU transmits at a different RU or MRU from any of other EHT MU PPDUs, the BSS/VBSS subfield is set to indicate that the EHT MU PPDU is transmitted in a BSS if the transmitting AP is an anchor AP of all the STAs intended by the EHT MU PPDU, or otherwise the BSS/VBSS subfield is set to indicate that the EHT MU PPDU is transmitted in a VBSS.

In some embodiments, a format of a user field for a non-MU-MIMO allocation or a MU-MIMO allocation depends on whether the EHT MU PPDU is transmitted in a BSS or VBSS. In some embodiments, if the EHT MU PPDU is transmitted in the VBSS, the user field for the non-MU-MIMO allocation or the MU-MIMO allocation comprises an AP ID subfield which, together with a STA-ID subfield, indicates a STA addressed by the user field. In some embodiments, the AP ID subfield is set to an AP ID of the AP in the AP candidate set corresponding to a VBSS color as specified in the U-SIG field; and the STA-ID subfield is set to a value of a TXVECTOR parameter STA_ID corresponding to the STA.

Embodiment 1

According to the first embodiment, the U-SIG field of an EHT MU PPDU may comprise a BSS/VBSS subfield and a BSS/VBSS Color subfield. For a MAPC capable STA, the BSS/VBSS subfield is interpreted to indicate whether the EHT MU PPDU is transmitted in a BSS or VBSS. For example, the BSS/VBSS subfield is set to a first value (e.g., 1) to indicate the EHT MU PPDU is transmitted in a BSS; and set to a second value (e.g., 0) to indicate that the EHT MU PPDU is transmitted in a VBSS. For example, the BSS/VBSS subfield is set to a second value (e.g., 0) to indicate the EHT MU PPDU is transmitted in a BSS; and set to a first value (e.g., 1) to indicate that the EHT MU PPDU is transmitted in a VBSS. In a multi-AP coordinated DL transmission, when the EHT MU PPDU, together with any of other EHT MU PPDUs, is transmitted at a same RU or MRU that occupies all non-punctured 20 MHz channels within a coordinated transmission bandwidth or a frequency portion of the coordinated transmission bandwidth, the BSS/VBSS subfield shall be set to indicate that the EHT MU PPDU is transmitted in a VBSS. When the EHT MU PPDU is transmitted a different RU or MRU from any of other EHT MU PPDUs, the BSS/VBSS subfield may be set to indicate that the EHT MU PPDU is transmitted in a BSS if the transmitting AP is the anchor AP of all the STAs intended by the EHT MU PPDU; and shall be set to indicate that the EHT MU PPDU is transmitted in a VBSS otherwise. For a MAPC incapable STA, the BSS/VBSS subfield is always interpreted to a Validate field which shall be set to 1. In other words, when a MAPC incapable STA receives an EHT MU PPDU with the BSS/VBSS subfield of U-SIG field set to 0, it would terminate the reception of the EHT MU PPDU. For a MAPC capable STA, the BSS/VBSS Color subfield is interpreted according to the value of the BSS/VBSS subfield. When the BSS/VBSS subfield is set to indicate the EHT MU PPDU is transmitted in a BSS, the BSS/VBSS Color subfield is interpreted to a BSS Color subfield which indicates a BSS color of the transmitting AP. When the BSS/VBSS subfield is set to indicate that the EHT MU PPDU is transmitted in a VBSS, the BSS/VBSS Color subfield is interpreted to a VBSS Color subfield which indicates a VBSS color of the AP candidate set. For a MAPC incapable STA, the BSS/VBSS Color subfield of the U-SIG field is always interpreted to the BSS Color subfield.

If the transmitting AP is a MAPC capable AP and the EHT MU PPDU is transmitted in a BSS, the BSS/VBSS subfield is set by the transmitting AP to indicate a transmission in the transmitting AP's BSS and the BSS/VBSS Color subfield is set by the transmitting AP to indicate a BSS color of the transmitting AP. If the transmitting AP is a MAPC capable AP and the EHT MU PPDU is transmitted in a VBSS, the BSS/VBSS subfield is set by the transmitting AP to indicate a transmission in the AP candidate set's VBSS and the VBSS/BSS Color subfield is set by the transmitting AP to indicate a VBSS color of the AP candidate set. If the transmitting AP is a MAPC incapable AP, the BSS/VBSS subfield is set by the transmitting AP to indicate a transmission in the transmitting AP's BSS and the BSS/VBSS Color subfield is set by the transmitting AP to indicate a BSS color of the transmitting AP.

In one embodiment, the BSS/VBSS subfield is one of the version independent fields of the U-SIG field. In this case, the BSS/VBSS subfield corresponds to B25 of the U-SIG-1 of the U-SIG field. In another embodiment, the BSS/VBSS subfield is one of the version dependent fields of the U-SIG field. In this case, the BSS/VBSS subfield corresponds to B2 or B8 of the U-SIG-2 of the U-SIG field. An example format of U-SIG field of EHT MU PPDU according to the first embodiment is illustrated in Table 2.

TABLE 2

| Two parts of U-SIG | Bit | Field | Number of bits | Description |
|---|---|---|---|---|
| U-SIG-1 | B0-B2 | PHY Version Identifier | 3 | Differentiate between different PHY clauses.<br>Set to 0 for EHT.<br>Values 1-7 are Validate. |
| | B3-B5 | BW | 3 | Set to 0 for 20 MHz;<br>Set to 1 for 40 MHz.<br>Set to 2 for 80 MHz;<br>Set to 3 for 160 MHz;<br>Set to 4 for 320 MHz-1;<br>Set to 5 for 320 MHz-2.<br>Values 6 and 7 are Validate. |
| | B6 | UL/DL | 1 | Set to 1 to indicate that the PPDU is addressed to the AP; set to 0 otherwise. |
| | B7-B12 | BSS/VBSS Color | 6 | When the EHT MU PPDU is transmitted in a BSS, indicates a BSS color of the BSS;<br>When the EHT MU PPDU is transmitted in a VBSS, indicates a VBSS color of the VBSS. |
| | B13-B19 | TXOP | 7 | Set to 127 to indicate no duration information.<br>Set to a value less than 127 to indicate duration information for NAV setting and protection of the TXOP. |
| | B20-B24 | Disregard | 5 | Set to all 1s and Disregard. |
| | B25 | BSS/VBSS | 1 | Set to 1 to indicate the EHT MU PPDU is transmitted in a BSS; and set to 0 to indicate the EHT MU PPDU is transmitted in a VBSS. |
| U-SIG-2 | B0-B1 | PPDU Type And Compression Mode | 2 | If the UL/DL field is set to 0, a value of 0 indicates a DL OFDMA transmission; and a value of 2 indicates a non-OFDMA DL MU-MIMO transmission.<br>A value of 1 indicates a transmission to a single user or an EHT sounding NDP regardless of UL/DL.<br>Undefined values of this field are Validate. |
| | B2 | Validate | 1 | Set to 1 and Validate. |
| | B3-B7 | Punctured Channel Information | 5 | If the PPDU Type And Compression Mode field is set to 1 or 2:<br>B3-B7 points to the entry of a bandwidth dependent table (defined in Table 36-30 of IEEE 802.11be D1.1) to signal the non-OFDMA puncturing pattern of the entire PPDU bandwidth. Undefined values of this field are Validate.<br>If the PPDU Type And Compression Mode field is set to 0:<br>If the BW field is set to a value between 2 and 5, B3-B6 is a 4-bit bitmap that indicates which 20 MHz channel is punctured in the relevant 80 MHz subblock, where B3-B6 apply to from the lowest to the highest frequency 20 MHz channels. For each of the bits B3-B6, a value of 0 indicates that the corresponding 20 MHz channel is punctured, and a value of 1 is used otherwise. The following allowed punctured |

TABLE 2-continued

| Two parts of U-SIG | Bit | Field | Number of bits | Description |
|---|---|---|---|---|
| | | | | patterns (B3-B6) are defined for an 80 MHz subblock: 1111 (no puncturing), 0111, 1011, 1101, 1110, 0011, 1100, and 1001. Any field values other than the allowed punctured patterns are Validate. Field value may be varied from one 80 MHz to the other. If the BW field is set to 0 or 1, B3-B6 are set to all 1s. Other values are Validate. B7 is set to 1 and Disregard. |
| | B8 | Validate | 1 | Set to 1 and Validate. |
| | B9-B10 | EHT-SIG MCS | 2 | Indicates the MCS used for modulating the EHT-SIG. Set to 0 for EHT-MCS 0. Set to 1 for EHT-MCS 1. Set to 2 for EHT-MCS 3. Set to 3 for EHT-MCS 15. |
| | B11-B15 | Number Of EHT-SIG Symbols | 5 | Indicates the number of EHT- SIG symbols. Set to a value that is the number of EHT-SIG symbols minus 1. This value shall be the same in every 80 MHz subblock. |
| | B16-B19 | CRC | 4 | CRC for bits 0-41 of the U-SIG field. Bits 0-41 of the U-SIG field correspond to bits 0-25 of U-SIG-1 followed by bits 0-15 of U-SIG-2. |
| | B20-B25 | Tail | 6 | Used to terminate the trellis of the convolutional decoder. Set to 0. |

Embodiment 2

In the second embodiment, it is assumed that VBSS colors are in a same value space with BSS colors. In this case, the value range of a VBSS color does not overlap with the value range of a BSS color. According to the second embodiment, the U-SIG field of an EHT MU PPDU may comprise a BSS/VBSS Color subfield. For a MAPC capable STA, the BSS/VBSS Color subfield is interpreted according to the value of the BSS/VBSS Color subfield. When the value of the BSS/VBSS Color subfield is in the value range of a BSS color, the BSS/VBSS Color subfield is interpreted to a BSS Color subfield which indicates a BSS color of the transmitting AP. When the value of the BSS/VBSS Color subfield is in the value range of a VBSS color, the BSS/VBSS Color subfield is interpreted to a VBSS Color subfield which indicates a VBSS color of the AP candidate set. For a MAPC incapable STA, the BSS/VBSS Color subfield is always interpreted to the BSS Color subfield.

In a multi-AP coordinated DL transmission, when the EHT MU PPDU, together with any of other EHT MU PPDUs, is transmitted at a same RU or MRU that occupies all non-punctured 20 MHz channels within a coordinated transmission bandwidth or a frequency portion of the coordinated transmission bandwidth, the EHT MU PPDU shall be transmitted in a VBSS. When the EHT MU PPDU is transmitted at a different RU or MRU from any of other EHT MU PPDUs, the EHT MU PPDU may be transmitted in a BSS if the transmitting AP is the anchor AP of all the STAs intended by the EHT MU PPDU; and shall be transmitted in a VBSS otherwise. If the transmitting AP is a MAPC capable AP and the EHT MU PPDU is transmitted in a BSS, the BSS/VBSS Color subfield is set by the transmitting AP to indicate a BSS color of the transmitting AP. If the transmitting AP is a MAPC capable AP and the EHT MU PPDU is transmitted in a VBSS, the VBSS/BSS Color subfield is set by the transmitting AP to indicate a VBSS color of the AP candidate set. If the transmitting AP is a MAPC incapable AP, the BSS/VBSS Color subfield is always set by the transmitting AP to indicate a BSS color of the transmitting AP. An example format of U-SIG field of EHT MU PPDU according to the second embodiment is illustrated in Table 3.

TABLE 3

| Two parts of U-SIG | Bit | Field | Number of bits | Description |
|---|---|---|---|---|
| U-SIG-1 | B0-B2 | PHY Version Identifier | 3 | Differentiate between different PHY clauses. Set to 0 for EHT. Values 1-7 are Validate. |
| | B3-B5 | BW | 3 | Set to 0 for 20 MHz; Set to 1 for 40 MHz. Set to 2 for 80 MHz; Set to 3 for 160 MHz; Set to 4 for 320 MHz-1; Set to 5 for 320 MHz-2. Values 6 and 7 are Validate. |

TABLE 3-continued

| Two parts of U-SIG | Bit | Field | Number of bits | Description |
|---|---|---|---|---|
| | B6 | UL/DL | 1 | Set to 1 to indicate that the PPDU is addressed to the AP; and set to 0 otherwise. |
| | B7-B12 | BSS/VBSS Color | 6 | When the EHT MU PPDU is transmitted in a BSS, indicates a BSS color of the BSS; When the EHT MU PPDU is transmitted in a VBSS, indicates a VBSS color of the VBSS. |
| | B13-B19 | TXOP | 7 | Set to 127 to indicate no duration information. Set to a value less than 127 to indicate duration information for NAV setting and protection of the TXOP. |
| | B20-B24 | Disregard | 5 | Set to all 1s and Disregard. |
| | B25 | Validate | 1 | Set to 1 and Validate. |
| U-SIG-2 | B0-B1 | PPDU Type And Compression Mode | 2 | If the UL/DL field is set to 0, a value of 0 indicates a DL OFDMA transmission; and a value of 2 indicates a non-OFDMA DL MU-MIMO transmission. A value of 1 indicates a transmission to a single user or an EHT sounding NDP regardless of UL/DL. Undefined values of this field are Validate. |
| | B2 | Validate | 1 | Set to 1 and Validate. |
| | B3-B7 | Punctured Channel Information | 5 | If the PPDU Type And Compression Mode field is set to 1 or 2: B3-B7 points to the entry of a bandwidth dependent table (defined in Table 36-30 of IEEE 802.11be D1.1) to signal the non-OFDMA puncturing pattern of the entire PPDU bandwidth. Undefined values of this field are Validate. If the PPDU Type And Compression Mode field is set to 0: If the BW field is set to a value between 2 and 5, B3-B6 is a 4-bit bitmap that indicates which 20 MHz channel is punctured in the relevant 80 MHz subblock, where B3-B6 apply to from the lowest to the highest frequency 20 MHz channels. For each of the bits B3-B6, a value of 0 indicates that the corresponding 20 MHz channel is punctured, and a value of 1 is used otherwise. The following allowed punctured patterns (B3-B6) are defined for an 80 MHz subblock: 1111 (no puncturing), 0111, 1011, 1101, 1110, 0011, 1100, and 1001. Any field values other than the allowed punctured patterns are Validate. Field value may be varied from one 80 MHz to the other. If the BW field is set to 0 or 1, B3-B6 are set to all 1s. Other values are Validate. B7 is set to 1 and Disregard. |
| | B8 | Validate | 1 | Set to 1 and Validate. |
| | B9-B10 | EHT-SIG MCS | 2 | Indicates the MCS used for modulating the EHT-SIG. Set to 0 for EHT-MCS 0. Set to 1 for EHT-MCS 1. Set to 2 for EHT-MCS 3. Set to 3 for EHT-MCS 15. |
| | B11-B15 | Number Of EHT-SIG Symbols | 5 | Indicates the number of EHT- SIG symbols. Set to a value that is the number of EHT-SIG symbols minus 1. This value shall be the same in every 80 MHz subblock. |
| | B16-B19 | CRC | 4 | CRC for bits 0-41 of the U-SIG field. Bits 0-41 of the U-SIG field correspond to bits 0-25 of U-SIG-1 followed by bits 0-15 of U-SIG-2. |

TABLE 3-continued

| Two parts of U-SIG | Bit | Field | Number of bits | Description |
|---|---|---|---|---|
| | B20-B25 | Tail | 6 | Used to terminate the trellis of the convolutional decoder. Set to 0. |

The EHT-SIG field provides additional signaling to the U-SIG field for STAs to interpret an EHT MU PPDU. The EHT-SIG field of a 20 MHz EHT MU PPDU contains one EHT-SIG content channel. For OFDMA transmission and for non-OFDMA transmission to multiple users, the EHT-SIG field of an EHT MU PPDU that is 40 MHz or 80 MHz contains two EHT-SIG content channels, and the EHT-SIG field of an EHT MU PPDU that is 160 MHz or wider contains two EHT-SIG content channels per 80 MHz. The EHT-SIG content channels per 80 MHz are allowed to carry different information when EHT MU PPDU bandwidth for OFDMA transmission is wider than 80 MHz. The EHT-SIG field of an EHT MU PPDU sent to a single user contains one EHT-SIG content channel and it is duplicated per 20 MHz when the EHT PPDU is equal to or wider than 40 MHz. For an EHT MU PPDU, the EHT-SIG content channel consists of a Common field followed by a User Specific field. An example format of Common field of EHT MU PPDU for OFDMA transmission is illustrated in Table 36-33 of IEEE 802.11be D1.2. An example format of Common field of EHT MU PPDU for non-OFDMA transmission is illustrated in Table 36-34 of IEEE 802.11be D1.2. In each EHT-SIG content channel, the User Specific field comprises one or more User field.

Embodiment 3

According to the third embodiment, a User field for a non-MU-MIMO allocation or a MU-MIMO allocation may comprise a STA-ID/VSTA-ID subfield which indicates the STA addressed by the User field. If the transmitting AP is a MAPC capable AP and the EHT MU PPDU is transmitted in a BSS, the STA-ID/VSTA-ID subfield is set by the transmitting AP to a value of the TXVECTOR parameter STA_ID. If the transmitting AP is a MAPC capable AP and the EHT MU PPDU is transmitted in a VBSS, the STA-ID/VSTA-ID subfield is set by the transmitting AP to a value of the TXVECTOR parameter VSTA_ID. If the transmitting AP is a MAPC incapable AP, the STA-ID/VSTA-ID subfield is always set by the transmitting AP to a value of the TXVECTOR parameter STA_ID.

For a MAPC capable STA, how the STA-ID/VSTA-ID subfield is interpreted depending on whether the EHT MU PPDU is transmitted in a BSS or VBSS, which is determined by the STA according to the value of the BSS/VBSS subfield of U-SIG field according to the first embodiment or the value of the BSS/VBSS Color subfield of U-SIG field according to the second embodiment. For a MAPC incapable STA, the STA-ID/VSTA-ID subfield is always interpreted to the STA-ID subfield. The TXVECTOR parameter STA_ID is defined in the IEEE 802.11be D1.2. The TXVECTOR parameter VSTA_ID indicates the list of VSTA-IDs for an EHT MU PPDU transmitted in a VBSS. Each parameter VSTA_ID in the TXVECTOR identifies the STA or group of STAs that is the recipient of an RU or MRU in the EHT MU PPDU. For an individually addressed RU or MRU, the parameter VSTA_ID is set to the 11 LSBs of the VAID of the STA receiving the PSDU contained in that RU or MRU. If an RU or MRU is intended for one or more STAs which are unassociated with the AP candidate set, then the parameter STA_ID for that RU or MRU is set to 2045. If an RU or MRU is intended for no user, then the parameter VSTA_ID for that RU or MRU is set to 2046. if the RU or MRU is intended for more than one associated STA in the VBSS that is not a recipient of an individually addressed RU or MRU, the parameter STA_ID for that RU or MRU is set to 0. The User field format for a non-MU-MIMO allocation according to the third embodiment is defined in Table 4; and the User field format for a MU-MIMO allocation according to the third embodiment is defined in Table 5.

TABLE 4

| Bit | Subfield | Number of bits | Description |
|---|---|---|---|
| B0-B10 | STA-ID/ VSTA-ID | 11 | When the EHT MU PPDU is transmitted in a BSS, indicates a value of TXVECTOR parameter STA_ID;<br>When the EHT MU PPDU is transmitted in a VBSS, indicates a value of TXVECTOR parameter VSTA_ID. |
| B11-B14 | MCS | 4 | If the STA-ID/VSTA-ID subfield is not 2046, this subfield indicates the following modulation and coding scheme:<br>Set to n for EHT-MCS n, where n= 0, 1, . . . , 15.<br>Set to an arbitrary value if the STA-ID/VSTA-ID subfield is 2046.<br>If the value of STA-ID/VSTA-ID subfield matches the user's STA-ID or VSTA-ID, the value of EHT-MCS 14 or EHT-MCS 15 is Validate if the condition described in 36.1.1 of IEEE 802.11be D1.2 is not met. If the value of STA-ID/VSTA-ID subfield does not match the user's STA-ID or VSTA-ID, all values are Disregard. |
| B15 | Reserved | 1 | Reserved and set to 1.<br>If the value of /VSTA-ID subfield matches the user's STA-ID or VSTA-ID, the Reserved subfield is Validate. If the value of STA-ID/VSTA-ID subfield does not match the user's STA-ID or VSTA-ID and the Reserved subfield is Disregard. |
| B16-B19 | NSS | 4 | If the STA-ID/VSTA-ID subfield is not equal to 2046, it indicates the number of spatial streams for up to eight spatial streams.<br>Set to the number of spatial streams minus 1.<br>Set to an arbitrary value if the STA-ID/VSTA-ID subfield is equal to 2046.<br>If the value of STA-ID/VSTA-ID subfield matches the user's STA-ID or VSTA-ID, other values are Validate. If the value of STA-ID/VSTA-ID subfield does not |

TABLE 4-continued

| Bit | Subfield | Number of bits | Description |
|---|---|---|---|
| | | | match the user's STA-ID or VSTA-ID, all values are Disregard. |
| B20 | Beamformed | 1 | If the STA-ID/VSTA-ID subfield is not 2046, this subfield is used to indicate transmit beamforming: Set to 1 if a beamforming steering matrix is applied to the waveform in a non-MU-MIMO allocation. Set to 0 otherwise. Set to an arbitrary value if the STA-ID/VSTA-ID subfield is 2046. |
| B21 | Coding | 1 | If the STA-ID/VSTA-ID subfield is not equal to 2046, this subfield indicates whether BCC or LDPC is used: Set to 0 for BCC. Set to 1 for LDPC. Set to an arbitrary value if the STA-ID/VSTA-ID subfield is 2046. If the value of STA-ID/VSTA-ID subfield does not match the user's STA-ID or VSTA-ID, all values are Disregard. |

TABLE 5

| Bit | Subfield | Number of bits | Description |
|---|---|---|---|
| B0-B10 | STA-ID/ VSTA-ID | 11 | When the EHT MU PPDU is transmitted in a BSS, indicates a value of TXVECTOR parameter STA_ID; When the EHT MU PPDU is transmitted in a VBSS, indicates a value of TXVECTOR parameter VSTA_ID. |
| B11-B14 | MCS | 4 | If the STA-ID/VSTA-ID subfield is not equal to 2046, this subfield indicates the following modulation and coding scheme: Set to n for EHT-MCS n, where n = 0, 1, . . . , 13. Set to an arbitrary value if the STA-ID/VSTA-ID subfield is equal to 2046. If the value of STA-ID subfield matches the user's STA-ID or VSTA-ID, other values are Validate. If the value of STA-ID/VSTA-ID subfield does not match the user's STA-ID or VSTA-ID, all values are Disregard. |
| B15 | Coding | 1 | If the STA-ID/VSTA-ID subfield is not equal to 2046, this subfield indicates whether BCC or LDPC is used: Set to 0 for BCC. Set to 1 for LDPC. If the RU size is larger than 242, this bit is reserved and set to 1. Set to an arbitrary value if the STA-ID/VSTA-ID subfield is equal to 2046. If the value of STA-ID subfield matches the user's STA-ID, the Reserved subfield is Validate. If the value of STA-ID subfield does not match the user's STA-ID, the Reserved subfield is Disregard. |

TABLE 5-continued

| Bit | Subfield | Number of bits | Description |
|---|---|---|---|
| B16-B21 | Spatial Configuration | 6 | Indicates the number of spatial streams for a user in a MU-MIMO allocation. If STA-ID or VSTA-ID matches, the values that are reserved or do not exist in Table 36-42 of IEEE 802.11be D1.2 are Validate. If STA-ID or VSTA-ID does not match, all values are Disregard. |

Embodiment 4

According to the fourth embodiment, the format of a User field for a non-MU-MIMO allocation or a MU-MIMO allocation depends on whether the EHT MU PPDU is transmitted in a BSS or VBSS. If the EHT MU PPDU is transmitted in a BSS, the format of a User field for a non-MU-MIMO allocation or a MU-MIMO allocation is defined in Table 36-40 or Table 36-41 of the IEEE 802.11be D1.2. If the EHT MU PPDU is transmitted in a VBSS, a User field for a non-MU-MIMO allocation or a MU-MIMO allocation may comprise an AP ID subfield which, together with a STA-ID subfield, indicates the STA addressed by the User field. The AP ID subfield is set to its AP ID in the AP candidate set corresponding to the VBSS color as specified in the U-SIG field; and the STA-ID subfield is set to a value of the TXVECTOR parameter STA_ID corresponding to the STA addressed by the User field.

Commercial interests for some embodiments are as follows. 1. Solving issues in the prior art. 2. Efficiently implementing multi-AP downlink (DL) coordination in a multi-AP system. 3. Achieving extremely high throughput. 4. Providing a good communication performance. 5. Providing a high reliability. 6. Some embodiments of the present disclosure are used by chipset vendors, communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in communication specification and/or communication standards such as IEEE specification and/or to standards create an end product. Some embodiments of the present disclosure propose technical mechanisms.

Figure 10:
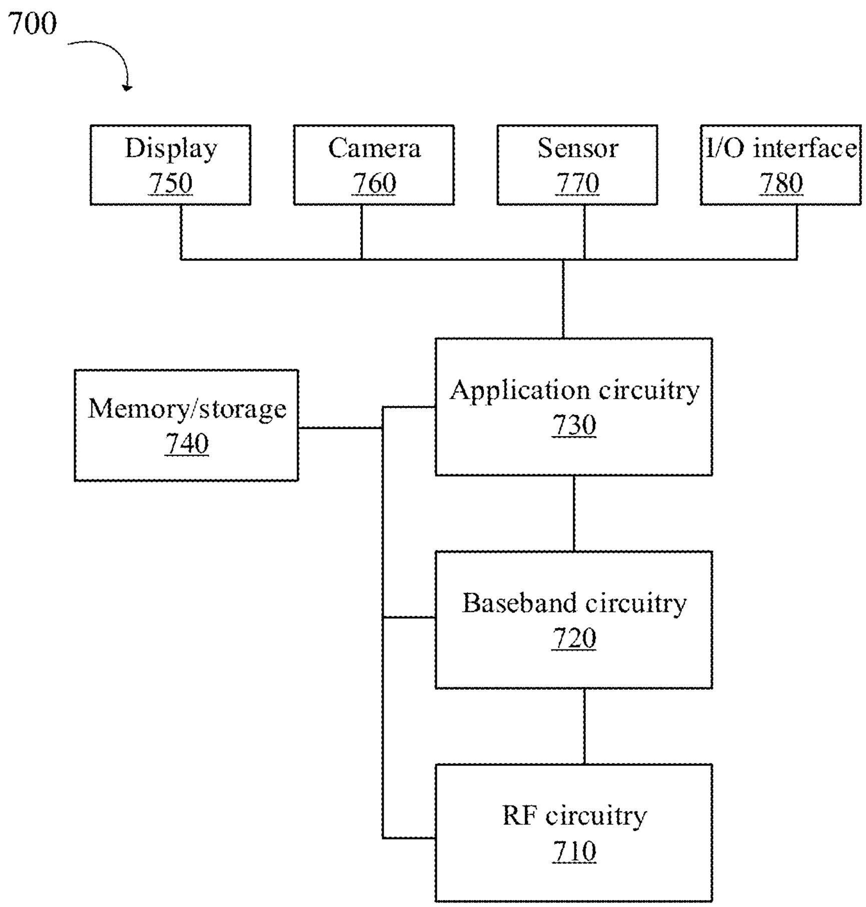
FIG. 10 is a block diagram of a system for wireless communication according to an embodiment of the present disclosure.

FIG. 10 is a block diagram of an example system 700 for wireless communication according to an embodiment of the present disclosure. Embodiments described herein may be implemented into the system using any suitably configured hardware and/or software. FIG. 10 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the AP or STA may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A station (STA), comprising:
- a memory configured to store instructions, a transceiver; and a processor coupled to the memory and the transceiver, wherein the instructions, when executed, cause the STA to:
  - receive, from an access point (AP), an extremely high throughput (EHT) multi-user (MU) physical layer protocol data unit (PPDU), wherein the EHT MU PPDU comprises a universal signal (U-SIG) field, and the U-SIG field comprises:
    - a U-SIG-1 part comprising:
      - a physical (PHY) version identifier subfield occupying bits B0 to B2 of the U-SIG-1 part;
      - a bandwidth (BW) subfield occupying bits B3-B5 of the U-SIG-1 part;
      - an uplink (UL)/downlink (DL) subfield occupying a bit B6 of the U-SIG-1 part;
      - a basic service set (BSS) or virtual BSS (VBSS) color subfield occupying bits B7-B12 of the U-SIG-1 part which indicates a BSS or VBSS color of the AP;
      - a transmission opportunity (TXOP) subfield occupying bits B13-B19 of the U-SIG-1 part;
      - a disregard subfield occupying bits B20-B24 of the U-SIG-1 part; and
      - a first validate subfield occupying a bit B25 of the U-SIG-1 part; and
    - a U-SIG-2 part comprising:
      - a PPDU type and compression mode subfield occupying bits B0-B1 of the U-SIG-2 part;
      - a second validate subfield occupying a bit B2 of the U-SIG-2 part;
      - a punctured channel information subfield occupying bits B3-B7 of the U-SIG-2 part;
      - a third validate subfield occupying a bit B8 of the U-SIG-2 part;
      - a EHT-SIG modulation and coding scheme (MCS) subfield occupying bits B9-B10 of the U-SIG-2 part, wherein the EHT-SIG MCS subfield indicates a MCS used for modulating an EHT-SIG, and the EHT-SIG MCS subfield is set to 0 for EHT-MCS 0, set to 1 for EHT-MCS 1, set to 2 for EHT-MCS 3, and set to 3 for EHT-MCS 15;
      - a Number Of EHT-SIG Symbols subfield occupying bits B11-B15 of the U-SIG-2 part;
      - a CRC subfield occupying bits B16-B19 of the U-SIG-2 part; and
      - a tail subfield occupying bits B20-B25 of the U-SIG-2 part.

2. The STA of claim 1, wherein VBSS colors of the BSS or VBSS color subfield in the U-SIG field share a same value space as BSS colors of the BSS or VBSS color subfield in the U-SIG field.

3. The STA of claim 1, wherein VBSS colors of the BSS or VBSS color subfield in the U-SIG field have a different value space from BSS colors of the BSS or VBSS color subfield in the U-SIG field.

4. The STA of claim 1, wherein a value range of a VBSS color of the BSS or VBSS color subfield in the U-SIG field is pre-defined or configurable.

5. The STA of claim 1, wherein if the AP is a MAPC incapable AP, the BSS or VBSS color subfield is always set to indicate the BSS color of the AP.

6. The STA of claim 1, wherein the EHT MU PPDU comprises one or more user fields, each user field comprises a STA-ID/VSTA-ID subfield, and the STA-ID/VSTA-ID subfield indicates the STA addressed by the user field.

7. The STA of claim 6, wherein one of the following:
- if the AP is a MAPC capable AP and the EHT MU PPDU is transmitted in a BSS, the STA-ID/VSTA-ID subfield is set to a value of a TXVECTOR parameter STA_ID;
- if the AP is a MAPC capable AP and the EHT MU PPDU is transmitted in a VBSS, the STA-ID/VSTA-ID subfield is set to a value of a TXVECTOR parameter VSTA_ID; and
- if the AP is a MAPC incapable AP, the STA-ID/VSTA-ID subfield is always set to a value of a TXVECTOR parameter STA ID.

8. The STA of claim 6, wherein each parameter VSTA_ID in a TXVECTOR identifies the STA or a group of STAs that is a recipient of a resource unit (RU) or multiple resource unit (MRU) in the EHT MU PPDU.

9. The STA of claim 6, wherein for an individually addressed RU or MRU, a parameter VSTA ID is set to 11 least significant bits (LSBs) of a virtual association identifier (VAID) of the STA receiving a PSDU contained in the RU or the MRU.

10. The STA of claim 9, wherein the VAID share a same value space as an AID, or the VAID have a different value space from an AID.

11. The STA of claim 9, wherein a value range of the VAID is pre-defined or configurable.

12. The STA of claim 6, wherein if the RU or MRU is intended for no user, a parameter VSTA_ID for the RU or MRU is set to 2046.

13. A wireless communication method by a station (STA), comprising:
- receiving, from an access point (AP), an extremely high throughput (EHT) multi-user (MU) physical layer protocol data unit (PPDU), wherein the EHT MU PPDU comprises a universal signal (U-SIG) field, and the U-SIG field comprises:
  - a U-SIG-1 part comprising:
    - a physical (PHY) version identifier subfield occupying bits B0 to B2 of the U-SIG-1 part;
    - a bandwidth (BW) subfield occupying bits B3-B5 of the U-SIG-1 part;
    - an uplink (UL)/downlink (DL) subfield occupying a bit B6 of the U-SIG-1 part;

a basic service set (BSS) or virtual BSS (VBSS) color subfield occupying bits B7-B12 of the U-SIG-1 part which indicates a BSS or VBSS color of the AP;

a transmission opportunity (TXOP) subfield occupying bits B13-B19 of the U-SIG-1 part;

a disregard subfield occupying bits B20-B24 of the U-SIG-1 part; and a first validate subfield occupying a bit B25 of the U-SIG-1 part; and a U-SIG-2 part comprising:

a PPDU type and compression mode subfield occupying bits B0-B1 of the U-SIG-2 part;

a second validate subfield occupying a bit B2 of the U-SIG-2 part;

a punctured channel information subfield occupying bits B3-B7 of the U-SIG-2 part;

a third validate subfield occupying a bit B8 of the U-SIG-2 part;

a EHT-SIG modulation and coding scheme (MCS) subfield occupying bits B9-B10 of the U-SIG-2 part, wherein the EHT-SIG MCS subfield indicates a MCS used for modulating an EHT-SIG, and the EHT-SIG MCS subfield is set to 0 for EHT-MCS 0, set to 1 for EHT-MCS 1, set to 2 for EHT-MCS 3, and set to 3 for EHT-MCS 15; and a Number Of EHT-SIG Symbols subfield occupying bits B11-B15 of the U-SIG-2 part;

a CRC subfield occupying bits B16-B19 of the U-SIG-2 part; and a tail subfield occupying bits B20-B25 of the U-SIG-2 part.

14. An access point (AP), comprising:

a memory configured to store instructions, a transceiver; and a processor coupled to the memory and the transceiver, wherein the instructions, when executed, cause the AP to:

transmit, to one or more stations (STAs), an extremely high throughput (EHT) multi-user (MU) physical layer protocol data unit (PPDU), wherein the EHT MU PPDU comprises a universal signal (U-SIG) field, and the U-SIG field comprises:

a U-SIG-1 part comprising:

a physical (PHY) version identifier subfield occupying bits B0 to B2 of the U-SIG-1 part;

a bandwidth (BW) subfield occupying bits B3-B5 of the U-SIG-1 part;

an uplink (UL)/downlink (DL) subfield occupying a bit B6 of the U-SIG-1 part;

a basic service set (BSS) or virtual BSS (VBSS) color subfield occupying bits B7-B12 of the U-SIG-1 part which indicates a BSS or VBSS color of the AP;

a transmission opportunity (TXOP) subfield occupying bits B13-B19 of the U-SIG-1 part;

a disregard subfield occupying bits B20-B24 of the U-SIG-1 part; and a first validate subfield occupying a bit B25 of the U-SIG-1 part; and a U-SIG-2 part comprising:

a PPDU type and compression mode subfield occupying bits B0-B1 of the U-SIG-2 part;

a second validate subfield occupying a bit B2 of the U-SIG-2 part;

a punctured channel information subfield occupying bits B3-B7 of the U-SIG-2 part;

a third validate subfield occupying a bit B8 of the U-SIG-2 part;

a EHT-SIG modulation and coding scheme (MCS) subfield occupying bits B9-B10 of the U-SIG-2 part, wherein the EHT-SIG MCS subfield indicates a MCS used for modulating an EHT-SIG, and the EHT-SIG MCS subfield is set to 0 for EHT-MCS 0, set to 1 for EHT-MCS 1, set to 2 for EHT-MCS 3, and set to 3 for EHT-MCS 15; and a Number Of EHT-SIG Symbols subfield occupying bits B11-B15 of the U-SIG-2 part;

a CRC subfield occupying bits B16-B19 of the U-SIG-2 part; and a tail subfield occupying bits B20-B25 of the U-SIG-2 part.

* * * * *